(12) United States Patent
Lu et al.

(10) Patent No.: US 12,341,559 B2
(45) Date of Patent: Jun. 24, 2025

(54) OPTICAL TRANSCEIVER APPARATUS AND OPTICAL SIGNAL PROCESSING METHOD

(71) Applicant: HUAWEI TECHNOLOGIES CO., LTD., Shenzhen (CN)

(72) Inventors: Yanzhao Lu, Dongguan (CN); Tao Gui, Dongguan (CN); Liangchuan Li, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 239 days.

(21) Appl. No.: 18/170,623

(22) Filed: Feb. 17, 2023

(65) Prior Publication Data

US 2023/0198620 A1    Jun. 22, 2023

Related U.S. Application Data

(63) Continuation of application No. PCT/CN2021/095560, filed on May 24, 2021.

(30) Foreign Application Priority Data

Aug. 26, 2020  (CN) .......................... 202010870439.5

(51) Int. Cl.
  *H04B 10/25*  (2013.01)
  *H04B 10/112*  (2013.01)
(52) U.S. Cl.
  CPC ......... *H04B 10/25* (2013.01); *H04B 10/1127* (2013.01)
(58) Field of Classification Search
  CPC .... H04B 10/25; H04B 10/1127; H04B 10/40; H04B 10/516; H04Q 11/0005; H04Q 11/0062; H04Q 2011/0092

USPC .......................................................... 398/24
See application file for complete search history.

(56) References Cited

U.S. PATENT DOCUMENTS 10,637,584 B1 *  4/2020  Palmer ................. H04B 10/079

FOREIGN PATENT DOCUMENTS

| CN | 101917233 A | * | 12/2010 | |
| CN | 107466448 A | * | 12/2017 | ............ H04B 10/40 |
| CN | 111049585 A | | 4/2020 | |
| CN | 111262623 A | * | 6/2020 | ........... H04B 10/071 |
| JP | H1168704 A | * | 3/1999 | ......... H04B 10/0779 |

\* cited by examiner

*Primary Examiner* — Abbas H Alagheband
(74) *Attorney, Agent, or Firm* — Maier & Maier, PLLC

(57) ABSTRACT

An optical transceiver apparatus and an optical signal processing method. The optical transceiver apparatus may include a light source, an optical signal processor, and an optical path selector. The light source is separately connected to the optical signal processor and the optical path selector, and the optical signal processor is connected to the optical path selector. The light source is configured to provide a first local oscillator optical signal and a first carrier optical signal. The optical signal processor is configured to modulate the first carrier optical signal and output a first modulated optical signal. The optical path selector is configured to transmit the first local oscillator optical signal and the first modulated optical signal to the optical signal processor or a transmission fiber. Herein, the transmission fiber is configured to transmit an optical signal to an outside of the optical transceiver apparatus.

20 Claims, 9 Drawing Sheets

OPTICAL TRANSCEIVER APPARATUS AND OPTICAL SIGNAL PROCESSING METHOD

CROSS-REFERENCE TO RELATED APPLICATIONS

This application is a continuation of international application No. PCT/CN2021/095560, filed on May 24, 2021, which claims priority to Chinese Patent Application No. 202010870439.5, filed on Aug. 26, 2020. The disclosures of the aforementioned applications are hereby incorporated by reference in their entireties.

TECHNICAL FIELD

The embodiments relate to the wireless communications field, an optical transceiver apparatus, and an optical signal processing method.

BACKGROUND

With continuous development of emerging applications such as a 5th generation (5G) mobile communications technology and artificial intelligence (AI), as a basic pipeline of a network, traffic of an optical communications network also increases exponentially. As a traffic of the optical communications network sharply increases, a requirement for a transmission technology of the optical communications network becomes increasingly higher. To overcome a limitation of a conventional intensity modulation-direct detection optical transmission technology, a coherent optical signal transmission technology is proposed. Compared with the conventional intensity modulation-direct detection optical transmission technology, the newly proposed coherent optical signal transmission technology is featured by a large bandwidth, a long transmission distance, high flexibility, or the like, so that the coherent optical signal transmission technology is widely applied to metropolitan area, backbone, and ocean optical communications networks.

However, in an existing coherent optical signal transmission architecture, each optical transceiver apparatus fixedly transmits an optical signal having one wavelength and receives an optical signal having another wavelength. However, in this fixed optical signal transmitting and receiving mode, the optical transceiver apparatus cannot implement many practical functions. For example, the optical transceiver apparatus cannot implement a self-loopback function due to different wavelengths of a transmitted signal and a received signal, and needs to be paired for use during a function test, and cannot be independently implemented. Therefore, in the existing coherent optical signal transmission architecture, the optical transceiver apparatus does not have functions such as the self-loopback function, can implement a single function, and has low applicability and practicality.

SUMMARY

To resolve the foregoing problem, the embodiments may provide an optical transceiver apparatus and an optical signal processing method, so that the optical transceiver apparatus can have functions such as a self-loopback function, and adaptability and practicality of the optical transceiver apparatus can be improved.

According to a first aspect, an embodiment may provide an optical transceiver apparatus. The optical transceiver apparatus includes a light source, an optical signal processor, and an optical path selector. The light source is separately connected to the optical signal processor and the optical path selector, and the optical signal processor is connected to the optical path selector. The light source may be configured to provide a first local oscillator optical signal and a first carrier optical signal, the optical signal processor is configured to: modulate the first carrier optical signal and output a first modulated optical signal, the optical path selector is configured to transmit the first local oscillator optical signal and the first modulated optical signal to the optical signal processor or a transmission fiber, and the transmission fiber is configured to transmit an optical signal to an outside of the optical transceiver apparatus.

Herein, the optical transceiver apparatus may flexibly control directions of the first modulated optical signal and the first local oscillator optical signal by using the optical path selector inside the optical transceiver apparatus, so that the first modulated optical signal and the first local oscillator optical signal can be transmitted to the outside of the optical transceiver apparatus through the transmission fiber to implement a signal transmission function of the optical transceiver apparatus, and can be transmitted to the optical signal processor inside the optical transceiver apparatus to implement a self-loopback function, thereby fully resolving a single function problem of an existing optical transceiver apparatus, and improving applicability and practicability of the optical transceiver apparatus.

With reference to the first aspect, in a possible implementation, the optical path selector is further configured to: receive, from the transmission fiber, a second local oscillator optical signal and a second modulated optical signal from an opposite optical transceiver apparatus, and transmit the second local oscillator optical signal and the second modulated signal to the optical signal processor. Wavelengths of the second local oscillator optical signal and the first local oscillator optical signal are different, and wavelengths of the second modulated optical signal and the first modulated optical signal are different.

With reference to the first aspect, in a possible implementation, the optical transceiver apparatus further includes a controller connected to the optical path selector. When the controller determines that a working mode of the optical transceiver apparatus is a first mode, the controller may generate and send first control information to the optical path selector. Herein, the first control information is used to control the optical path selector to transmit the first local oscillator optical signal and the first modulated optical signal to the optical signal processor. When the controller determines that the working mode of the optical transceiver apparatus is a second mode, the controller may generate and send second control information to the optical path selector. Herein, the second control information is used to control the optical path selector to transmit the first local oscillator optical signal and the first modulated optical signal to the transmission fiber and transmit the second local oscillator optical signal and the second modulated optical signal to the optical signal processor.

With reference to the first aspect, in a possible implementation, when the working mode of the optical transceiver apparatus is the second mode, if the controller determines that an apparatus type of the optical transceiver apparatus is a first type, the controller may further generate and send third control information to the light source. After receiving the third control information, the light source is configured to output the first local oscillator optical signal and the first carrier optical signal that have a first preset wavelength. If the controller determines that the apparatus type of the optical transceiver apparatus is a second type, the controller may further generate and send fourth control information to the light source. After receiving the fourth control information, the light source is configured to output the first local oscillator optical signal and the first carrier optical signal that have a second preset wavelength.

Herein, the light source of the optical transceiver apparatus may output continuous light having at least two wavelengths, and a wavelength of an optical signal transmitted or received by the optical transceiver apparatus may be restricted by setting the apparatus type of the optical transceiver apparatus. In this way, at least two such optical transceiver apparatuses may be used to implement a complete optical communications system. Therefore, in an actual development and production process, only one optical transceiver apparatus needs to be developed and produced. Compared with the conventional technology in which at least two optical transceiver apparatuses that can be paired for use need to be developed and produced, in this embodiment, development and production costs can be greatly reduced, and applicability and practicality of the optical transceiver apparatus can be significantly improved.

With reference to the first aspect, in a possible implementation, the light source includes a tunable laser and an optical splitter. When the light source receives the third control information, the tunable laser is configured to output continuous light having the first preset wavelength. The optical splitter is configured to split the continuous light having the first preset wavelength, to obtain the first local oscillator optical signal and the first carrier optical signal. When the light source receives the fourth control information, the tunable laser is configured to output continuous light having the second preset wavelength. The optical splitter is configured to split the continuous light having the second preset wavelength, to obtain the first local oscillator optical signal and the first carrier optical signal. Herein, the tunable laser and the optical splitter form a light source that can output continuous light having at least two wavelengths, so that the light source has a simple structure and stable performance, to facilitate development and production of the light source, and improve applicability of the optical transceiver apparatus.

With reference to the first aspect, in a possible implementation, the light source includes a first laser, a second laser, and an optical splitter. When the light source receives the third control information, the first laser is configured to output continuous light having the first preset wavelength. The optical splitter is configured to split the continuous light having the first preset wavelength, to obtain the first local oscillator optical signal and the first carrier optical signal. When the light source receives the fourth control information, the second laser is configured to output continuous light having the second preset wavelength. The optical splitter is configured to split the continuous light having the second preset wavelength, to obtain the first local oscillator optical signal and the first carrier optical signal. Herein, at least two lasers with low costs and one optical splitter form a light source that can output continuous light having at least two wavelengths, to reduce development and production costs of the light source, thereby improving practicality of an optical transceiver apparatus.

With reference to the first aspect, in a possible implementation, the optical path selector includes a first port, a second port, and a third port that are connected to the optical signal processor, a fourth port that is connected to the light source, and a fifth port, a sixth port, a seventh port, and an eighth port that are connected to the transmission fiber. When the optical path selector receives the first control information, the optical path selector is configured to: establish an optical connection between the first port and the second port and establish an optical connection between the third port and the fourth port, to transmit, to the optical signal processor through the second port, the first modulated optical signal output by the first port, and transmit, to the optical signal processor through the third port, the first local oscillator optical signal output by the fourth port. When the optical path selector receives the second control information, the optical path selector is configured to separately establish an optical connection between the first port and the fourth port and an optical connection between the fifth port and the eighth port, to transmit, to the transmission fiber through the fifth port and the eighth port, the first modulated optical signal output by the first port and the first local oscillator optical signal output by the fourth port. In addition, the optical path selector may separately establish an optical connection between the second port and the third port and an optical connection between the sixth port and the eighth port, to transmit, to the optical signal processor through the second port and the third port, the second local oscillator optical signal and the second modulated optical signal that are received by the sixth port and the eighth port.

With reference to the first aspect, in a possible implementation, the transmission fiber includes a first transmission fiber and a second transmission fiber, and the optical transceiver apparatus further includes a first wavelength selector and a second wavelength selector. The fifth port and the sixth port are connected to the first transmission fiber by using the first wavelength selector, and the first wavelength selector is configured to separate an optical signal transmitted between the fifth port and the first transmission fiber and an optical signal transmitted between the sixth port and the first transmission fiber that have different wavelengths. The seventh port and the eighth port are connected to the second transmission fiber by using the second wavelength selector, and the first wavelength selector is configured to separate an optical signal transmitted between the seventh port and the second transmission fiber and an optical signal transmitted between the eighth port and the second transmission fiber that have different wavelengths. Herein, the optical path selector is separately connected to two transmission fibers by using two wavelength selectors, so that the optical transceiver apparatus may be applicable to a dual-fiber transmission scenario, and applicability of the optical transceiver apparatus can be improved.

With reference to the first aspect, in a possible implementation, the wavelength selector includes at least one of the following apparatuses: a wavelength division multiplexer and a wavelength selective switch.

With reference to the first aspect, in a possible implementation, the transmission fiber includes a third transmission fiber, a fourth transmission fiber, a fifth transmission fiber, and a sixth transmission fiber. Herein, the fifth port is connected to the third transmission fiber, the sixth port is connected to the fourth transmission fiber, the seventh port is connected to the fifth transmission fiber, and the eighth port is connected to the sixth transmission fiber. Herein, the optical path selector is directly connected to four transmission fibers, so that the optical transceiver apparatus may be applicable to a four-fiber transmission scenario, and applicability of the optical transceiver apparatus can be improved.

With reference to the first aspect, in a possible implementation, the optical path selector includes at least one of the following apparatuses: a micro-electro-mechanical system (MEMS), an optical waveguide, and a silicon optical waveguide.

According to a second aspect, an embodiment may provide an optical signal processing method. The optical signal processing method is applied to an optical transceiver apparatus. The optical transceiver apparatus may be the optical transceiver apparatus provided in the first aspect. The optical transceiver apparatus includes a light source, an optical signal processor, and an optical path selector. The light source is separately connected to the optical signal processor and the optical path selector, and the optical signal processor is connected to the optical path selector. The light source is configured to provide a first local oscillator optical signal and a first carrier optical signal, and the optical signal processor is configured to: modulate the first carrier optical signal and output a first modulated optical signal that has a same wavelength as the first carrier optical signal. The method includes: A controller generates control information based on a working mode of the optical transceiver apparatus. The controller controls, based on the control information, the optical path selector to transmit the first local oscillator optical signal and the first modulated optical signal to the optical signal processor or a transmission fiber. The transmission fiber is configured to transmit an optical signal to an outside of the optical transceiver apparatus.

With reference to the second aspect, in a possible implementation, a second local oscillator optical signal and a second modulated optical signal from an opposite optical transceiver apparatus may be received from the transmission fiber by using the optical path selector. The second local oscillator optical signal and the second modulated optical signal are transmitted to the optical signal processor.

With reference to the second aspect, in a possible implementation, the working mode includes a first mode and a second mode. When it is determined that the working mode of the optical transceiver apparatus is the first mode, first control information is generated. The first control information is used to control the optical path selector to transmit the first local oscillator optical signal and the first modulated optical signal to the optical signal processor. When it is determined that the working mode of the optical transceiver apparatus is the second mode, second control information is generated. The second control information is used to control the optical path selector to transmit the first local oscillator optical signal and the first modulated optical signal to the transmission fiber.

With reference to the second aspect, in a possible implementation, when it is determined that the working mode of the optical transceiver apparatus is the second mode, if it is determined that an apparatus type of the optical transceiver apparatus is a first type, third control information is sent to the light source, and the third control information is used to control the light source to output the first local oscillator optical signal and the first carrier optical signal that have the first preset wavelength. If it is determined that the apparatus type of the optical transceiver apparatus is a second type, fourth control information is sent to the light source, and the fourth control information is used to control the light source to output the first local oscillator optical signal and the first carrier optical signal that have the second preset wavelength.

With reference to the second aspect, in a possible implementation, the light source includes a tunable laser and an optical splitter. The controller may control, based on the third control information, the tunable laser to output continuous light having the first preset wavelength, and control the optical splitter to split the continuous light having the first preset wavelength, so that the light source outputs the first local oscillator optical signal and the first carrier optical signal that have the first preset wavelength.

With reference to the second aspect, in a possible implementation, the light source includes a tunable laser and an optical splitter. The controller may control, based on the fourth control information, the tunable laser to output continuous light having the second preset wavelength, and control the optical splitter to split the continuous light having the second preset wavelength, so that the light source outputs the first local oscillator optical signal and the first carrier optical signal that have the second preset wavelength.

With reference to the second aspect, in a possible implementation, the light source includes a first laser and an optical splitter. The controller may control, based on the third control information, the first laser to output continuous light having the first preset wavelength, and control the optical splitter to split the continuous light having the first preset wavelength, so that the light source outputs the first local oscillator optical signal and the first carrier optical signal that have the first preset wavelength.

With reference to the second aspect, in a possible implementation, the light source may further include a second laser. The controller may control, based on the fourth control information, the second laser to output the continuous light having the second preset wavelength, and control the optical splitter to split the continuous light having the second preset wavelength, so that the light source outputs the first local oscillator optical signal and the first carrier optical signal that have the second preset wavelength.

With reference to the second aspect, in a possible implementation, the optical path selector includes a first port, a second port, and a third port that are connected to the optical signal processor, a fourth port that is connected to the light source, and a fifth port, a sixth port, a seventh port, and an eighth port that are connected to the transmission fiber. The controller may send the first control information to the optical path selector, and control, based on the first control information, the optical path selector to establish an optical connection between the first port and the second port and establish an optical connection between the third port and the fourth port, to transmit, to the optical signal processor through the second port, the first modulated optical signal output by the first port, and transmit, to the optical signal processor through the third port, the first local oscillator optical signal output by the fourth port. Alternatively, the controller may send the second control information to the optical path selector, and control, based on the second control information, the optical path selector to separately establish an optical connection between the first port and the fourth port and an optical connection between the fifth port and the eighth port, to transmit, to the transmission fiber through the fifth port and the eighth port, the first modulated optical signal output by the first port and the first local oscillator optical signal output by the fourth port.

With reference to the second aspect, in a possible implementation, before the second local oscillator optical signal and the second modulated optical signal from an opposite optical transceiver apparatus are received from the transmission fiber by using the optical path selector, the controller may further control, based on the second control information, the optical path selector to separately establish an optical connection between the second port and the third port and an optical connection between the sixth port and the seventh port. Herein, the sixth port and the seventh port are configured to receive the second local oscillator optical signal and the second modulated optical signal from the transmission fiber.

With reference to the second aspect, in a possible implementation, the transmission fiber includes a first transmission fiber and a second transmission fiber, and the optical transceiver apparatus further includes a first wavelength selector and a second wavelength selector. The fifth port and the sixth port are connected to the first transmission fiber by using the first wavelength selector, and the first wavelength selector is configured to separate an optical signal transmitted between the fifth port and the first transmission fiber and an optical signal transmitted between the sixth port and the first transmission fiber that have different wavelengths. The seventh port and the eighth port are connected to the second transmission fiber by using the second wavelength selector, and the first wavelength selector is configured to separate an optical signal transmitted between the seventh port and the first transmission fiber and an optical signal transmitted between the eighth port and the first transmission fiber that have different wavelengths.

With reference to the second aspect, in a possible implementation, a wavelength selector includes at least one of the following apparatuses: a wavelength division multiplexer and a wavelength selective switch.

With reference to the second aspect, in a possible implementation, the transmission fiber includes a third transmission fiber, a fourth transmission fiber, a fifth transmission fiber, and a sixth transmission fiber. The fifth port is connected to the third transmission fiber, the sixth port is connected to the fourth transmission fiber, the seventh port is connected to the fifth transmission fiber, and the eighth port is connected to the sixth transmission fiber.

With reference to the second aspect, in a possible implementation, the optical path selector includes at least one of the following apparatuses: an MEMS, an optical waveguide, and a silicon optical waveguide.

In the optical signal processing method, the optical transceiver apparatus may control the optical path selector by using the controller, so that the optical path selector can feed back, to the signal processor, the first local oscillator optical signal and the first modulated optical signal that are generated by the light source and the optical signal processor, or transmit the first local oscillator optical signal and the first modulated optical signal to a transmission fiber, so that the optical transceiver apparatus can transmit and receive an optical signal and implement a self-loopback function. A single function problem of an existing optical transceiver apparatus is fully resolved, and applicability and practicality of the optical transceiver apparatus can be improved.

According to a third aspect, an embodiment may further provide an optical communications system. The system may include at least two optical transceiver apparatuses provided in the first aspect, and the at least two optical transceiver apparatuses are set to different apparatus types.

The optical transceiver apparatus in the embodiments may implement functions such as optical signal transmitting and receiving functions or a closed-loop function by using the optical path selector, to improve applicability and practicality of the optical transceiver apparatus.

DETAILED DESCRIPTION OF THE EMBODIMENTS

A device form and a service scenario are used to describe the embodiments more clearly, and do not constitute a limitation on the embodiments. It may be understood by a person of ordinary skill in the art that, as the device form evolves and a new service scenario emerges, the embodiments are also applicable to similar problems.

The embodiments may be applicable to different service scenarios, including, but not limited to: a backbone optical transmission network, an optical access network, a short-distance optical interconnection, a long-distance optical interconnection, and wireless service fronthaul/backhaul.

Figure 1:
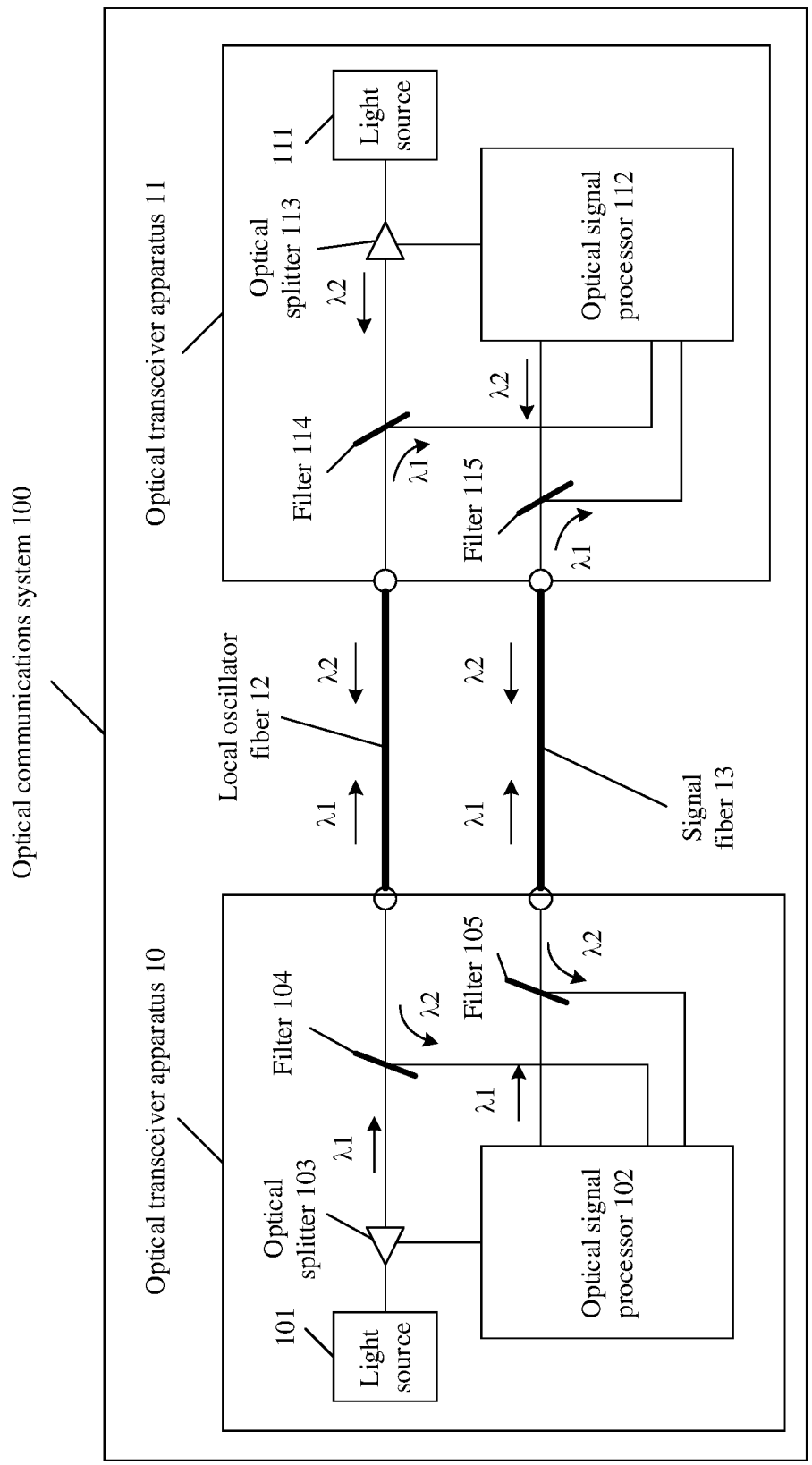
FIG. 1 is a schematic diagram of a structure of an existing optical communications system according to an embodiment.

FIG. 1 is a schematic diagram of a structure of an existing optical communications system according to an embodiment. As shown in FIG. 1, an existing optical communications system 100 includes an optical transceiver apparatus 10 and an optical transceiver apparatus 11 that are coupled by using a local oscillator fiber 12 and a signal fiber 13. The optical transceiver apparatus 10 and the optical transceiver apparatus 11 may be opposite optical transceiver apparatuses of each other. The optical transceiver apparatus 10 and the optical transceiver apparatus 11 may simultaneously send an optical signal to each other, and simultaneously receive an optical signal from each other. Therefore, the optical transceiver apparatus 10 and the optical transceiver apparatus 11 may provide bidirectional communication in the optical communications system. As shown in FIG. 1, the optical transceiver apparatus 10 may include a light source 101, an optical signal processor 102, an optical splitter 103, a filter 104, and a filter 105. The optical transceiver apparatus 11 may include a light source 111, an optical signal processor 112, an optical splitter 113, a filter 114, and a filter 115. Herein, it is assumed that the optical transceiver apparatus 10 is configured to: output a local oscillator optical signal and a modulated optical signal that have a wavelength $\lambda 1$ and receive a local oscillator optical signal and a modulated optical signal that have a wavelength $\lambda 2$, and that the optical transceiver apparatus 11 is correspondingly configured to: output the local oscillator optical signal and the modulated optical signal that have the wavelength $\lambda 2$ and receive the local oscillator optical signal and the modulated optical signal that have the wavelength $\lambda 1$. In an actual optical signal transmitting and receiving process, the light source 101 in the optical transceiver apparatus 10 may be configured to provide continuous light having the wavelength $\lambda 1$. Then, the continuous light having the wavelength $\lambda 1$ is decomposed by the optical splitter 103 into the local oscillator optical signal having the wavelength $\lambda 1$ and a carrier optical signal having the wavelength $\lambda 1$. It should be noted herein that, in this embodiment, light that is output by a light source and that is not processed may be collectively referred to as continuous light, and light that is processed by an optical splitter or a modulator may be collectively referred to as an optical signal. For example, the light source 101 outputs continuous light having the wavelength $\lambda 1$, and the light obtained after decomposition performed by the optical splitter 103 is the local oscillator optical signal having the wavelength $\lambda 1$ and the carrier optical signal having the wavelength $\lambda 1$. It should be understood that the foregoing setting is merely used to help understand and distinguish between light existing before and after processing operations such as splitting or optical modulation and does not have another limitation function. Then, the local oscillator optical signal having the wavelength $\lambda 1$ is output to the local oscillator fiber 12 by using the filter 104, and the carrier optical signal having the wavelength $\lambda 1$ is output to the optical signal processor 102. Then, the optical signal processor 102 may perform optical signal modulation on the carrier optical signal having the wavelength $\lambda 1$, to obtain the modulated optical signal having the wavelength $\lambda 1$, and transmit the modulated optical signal having the wavelength $\lambda 1$ to the signal fiber 13 by using the filter 105. Then, the local oscillator fiber 12 may transmit the local oscillator optical signal having the wavelength $\lambda 1$ to the optical transceiver apparatus 11, and the signal fiber 13 may transmit the modulated optical signal having the wavelength $\lambda 1$ to the optical transceiver apparatus 11. In addition, the filter 104 may further receive, from the local oscillator fiber 12, the local oscillator optical signal having the wavelength $\lambda 2$ from the optical transceiver apparatus 11, and transmit the local oscillator optical signal having the wavelength $\lambda 2$ to the optical signal processor 102. The filter 105 may receive, from the signal fiber 13, the modulated optical signal having the wavelength $\lambda 2$ from the optical transceiver apparatus 11 and transmit the modulated optical signal having the wavelength $\lambda 2$ to the optical signal processor 102. Herein, the filter 104 may be configured to separate the local oscillator optical signal having the wavelength $\lambda 1$ from the local oscillator optical signal having the wavelength $\lambda 2$, and the filter 105 may be used to separate the modulated optical signal having the wavelength $\lambda 1$ from the modulated optical signal having the wavelength $\lambda 2$. Similarly, each component in the optical transceiver apparatus 11 may also execute a function executed by a corresponding component in the optical transceiver apparatus 10, to transmit the modulated optical signal and the local oscillator optical signal that have the wavelength $\lambda 2$ and receive the modulated optical signal and the local oscillator optical signal that have the wavelength $\lambda 1$.

However, in the existing optical communications system 100 in which a coherent optical signal transmission architecture is used, each optical transceiver apparatus can fixedly transmit only a local oscillator optical signal and a modulated optical signal that have one wavelength, and receive only a local oscillator optical signal and a modulated optical signal that have another wavelength. For example, the optical transceiver apparatus 10 can send only the modulated optical signal and the local oscillator optical signal that have the wavelength $\lambda 1$, and receive only the modulated optical signal and the local oscillator optical signal that have the wavelength $\lambda 2$. The optical transceiver apparatus 11 paired with the optical transceiver apparatus 10 can send only the modulated optical signal and the local oscillator optical signal that have the wavelength $\lambda 2$, and receive the modulated optical signal and the local oscillator optical signal that have the wavelength $\lambda 1$. In this architecture, the optical transceiver apparatus cannot implement a self-loopback function due to different wavelengths of a transmitted signal and a received signal. For example, the modulated optical signal and the local oscillator optical signal that have the wavelength $\lambda 1$ and that are sent by the optical transceiver apparatus 10 cannot be returned to the optical signal processor 102 of the optical transceiver apparatus 10 by using the filter 104 and the filter 105. It should be noted herein that the self-loopback function means that an optical transceiver apparatus can receive a local oscillator optical signal and a modulated optical signal that are transmitted by the optical transceiver apparatus, to form a closed loop of optical signal transmitting and receiving. The optical transceiver apparatus may implement an operation such as function debugging or optical path self-detection by using the self-loopback function. Because the optical transceiver apparatus 10 does not have the self-loopback function, during function debugging, the optical transceiver apparatus 10 needs to cooperate with the optical transceiver apparatus 11, to implement the operation such as function debugging. Therefore, in an existing coherent optical signal transmission architecture, an optical transceiver apparatus does not have functions such as a self-loopback function, has a single function, and has low applicability and practicality.

Therefore, there may be a need to enable the optical transceiver apparatus to have the functions such as the self-loopback function to improve applicability and practicality of the optical transceiver apparatus.

Embodiment 1

Figure 2:
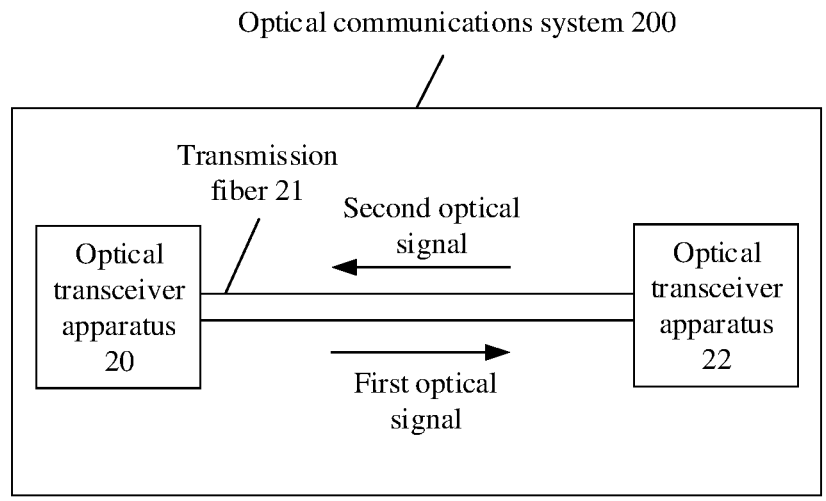
FIG. 2 is a schematic diagram of a structure of an optical communications system according to an embodiment.

FIG. 2 is a schematic diagram of a structure of an optical communications system according to an embodiment. A coherent optical signal transmission architecture is used for an optical communications system 200. As shown in FIG. 2, the optical communications system 200 may include an optical transceiver apparatus 20, a transmission fiber 21, and an optical transceiver apparatus 22. An optical connection is established between the optical transceiver apparatus 20 and the optical transceiver apparatus 22 by using the transmission fiber 21. In an actual bidirectional transmission process, the optical transceiver apparatus 20 and the optical transceiver apparatus 22 are opposite optical transceiver apparatuses of each other. The optical transceiver apparatus 20 may send, to the optical transceiver apparatus 22 through the transmission fiber 21, a first optical signal generated by the optical transceiver apparatus 20. The first optical signal may include a local oscillator optical signal (for ease of distinguishing, the following uses a first local oscillator optical signal as a substitute for description) and a modulated optical signal (for ease of distinguishing, the following uses a first modulated optical signal as a substitute for description) that have a same wavelength. In addition, the optical transceiver apparatus 20 may further receive, through the transmission fiber 21, a second optical signal generated and sent by the optical transceiver apparatus 22. The second optical signal may include a local oscillator optical signal (for ease of distinguishing, the following uses a second local oscillator optical signal as a substitute for description) and a modulated optical signal (for ease of distinguishing, the following uses a second modulated optical signal as a substitute for description) that have a same wavelength. Herein, a transmitting and receiving process of an optical signal of the optical transceiver apparatus 22 is the same as a transmitting and receiving process of an optical signal of the optical transceiver apparatus 20, and details are not described herein again. It should be noted herein that, to reduce interference between the first optical signal and the second optical signal, wavelengths of the first local oscillator optical signal and the second local oscillator optical signal are different, and wavelengths of the first modulated optical signal and the second modulated optical signal are different.

Figure 3:
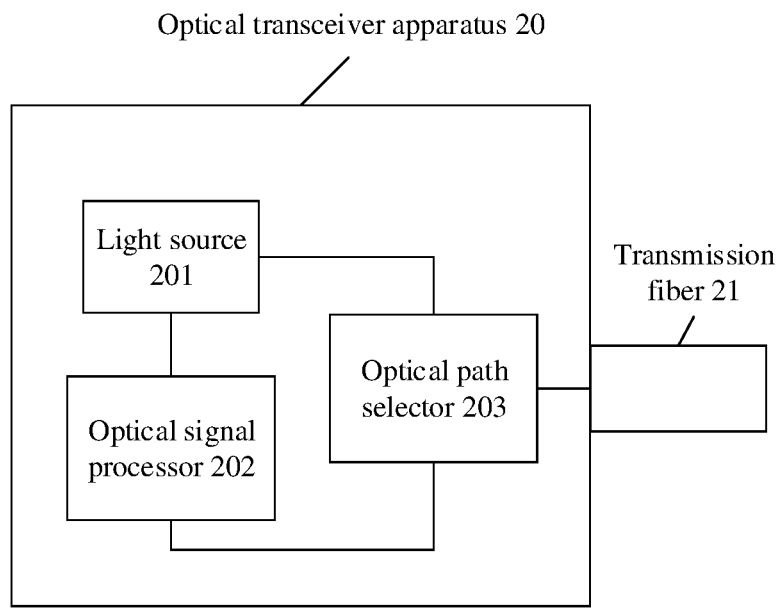
FIG. 3 is a schematic diagram of a structure of an optical transceiver apparatus according to an embodiment.

In the following, because the optical transceiver apparatus 20 and the optical transceiver apparatus 22 have similar structures and function implementations, but wavelengths of sent and received optical signals are different, the optical transceiver apparatus 20 is used as an example to describe in detail a structure and a working principle of the optical transceiver apparatus provided in this embodiment. FIG. 3 is a schematic diagram of a structure of an optical transceiver apparatus according to an embodiment. As shown in FIG. 3, the optical transceiver apparatus 20 may include a light source 201, an optical signal processor 202, and an optical path selector 203. The light source 201 is separately connected to the optical signal processor 202 and the optical path selector 203, and the optical signal processor 202 is connected to the optical path selector 203. It should be noted that connections established among the light source 201, the optical signal processor 202, and the optical path selector 203 may include an optical connection, to implement transmission of an optical signal among the light source 201, the optical signal processor 202, and the optical path selector 203. Herein, a medium for establishing the optical connection may include a fiber, an optical waveguide, and the like. This is not limited herein. Further, the connections established among the light source 201, the optical signal processor 202, and the optical path selector 203 may further include an electrical connection, to implement transmission of an electrical signal among the light source 201, the optical signal processor 202, and the optical path selector 203.

In an implementation, the light source 201 may be configured to: generate and output a first local oscillator optical signal to the optical path selector 203, and generate and send, to the optical signal processor 202, an optical carrier signal (for ease of distinguishing, the following uses a first carrier optical signal as a substitute for description) corresponding to the first modulated optical signal. Herein, the first local oscillator optical signal and the first carrier optical signal have a same wavelength. The optical signal processor 202 may be configured to: perform optical modulation on the first carrier optical signal, to obtain a corresponding modulated optical signal (for ease of distinguishing, the following uses a first modulated optical signal as a substitute for description) and send the first modulated optical signal to the optical path selector 203. Then, the optical path selector 203 may be configured to transmit the first modulated optical signal and the first local oscillator optical signal that are received by the optical path selector 203 to the transmission fiber 21 that is connected to the optical transceiver apparatus or the optical signal processor 202. Herein, the transmission fiber 21 may be configured to send an optical signal from the optical path selector 203 to an outside of the optical transceiver apparatus 20.

Optionally, when the optical path selector 203 transmits the first local oscillator optical signal and the first modulated optical signal to the transmission fiber 21, if a second local oscillator optical signal and a second modulated optical signal that are sent by an opposite optical transceiver apparatus (that is, the optical transceiver apparatus 22 described above) are also transmitted on the transmission fiber 21, the optical path selector 203 may be further configured to: receive the second local oscillator optical signal and the second modulated optical signal, and transmit the second local oscillator optical signal and the second modulated optical signal to the optical signal processor 202. Then, the optical signal processor 202 may perform coherent demodulation on the second modulated optical signal based on the second local oscillator optical signal.

Herein, the optical transceiver apparatus 20 may flexibly control directions of the first modulated optical signal and the first local oscillator optical signal by using the optical path selector 203 inside the optical transceiver apparatus 20, so that the first modulated optical signal and the first local oscillator optical signal can be transmitted to the outside of the optical transceiver apparatus 20 through the transmission fiber 21 to implement a signal transmission function of the optical transceiver apparatus 20, and can be transmitted to the optical signal processor 202 inside the optical transceiver apparatus 20 to implement a self-loopback function, thereby improving applicability and practicability of the optical transceiver apparatus.

Figure 4:
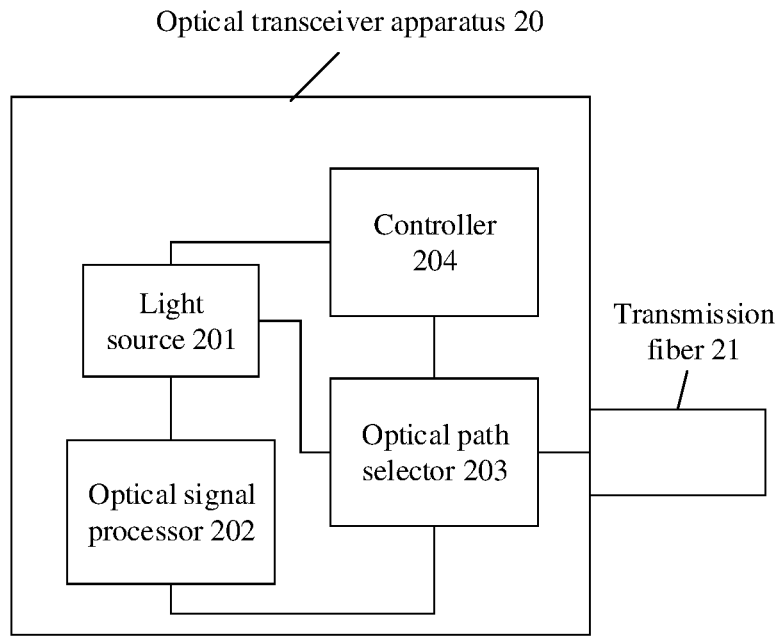
FIG. 4 is another schematic diagram of a structure of an optical transceiver apparatus according to an embodiment.

In some optional implementations, FIG. 4 is another schematic diagram of a structure of an optical transceiver apparatus according to an embodiment. As shown in FIG. 4, the optical transceiver apparatus 20 may further include a controller 204. The controller 204 is separately electrically connected to the light source 201 and the optical path selector 203. Herein, the controller 204 may be configured to: generate control information based on a working mode of the optical transceiver apparatus 20 and control the optical path selector 203 to send the first local oscillator optical signal and the first modulated optical signal to the optical signal processor 202 or the transmission fiber 21 based on the control information.

In an implementation, the controller 204 may first determine a current working mode of the optical transceiver apparatus 20. Herein, the working mode may include a preset first mode and a preset second mode. In the first mode, the optical transceiver apparatus 20 may be configured to implement the self-loopback function. In the second mode, the optical transceiver apparatus 20 may be configured to perform mutual transmission of an optical signal with the optical transceiver apparatus 22. The controller 204 may first obtain working mode indication information used for setting the working mode of the optical transceiver apparatus 20. Herein, the working mode indication information may be extracted by the controller 204 from a user instruction received by the controller 204 or may be extracted by the controller 204 from information received by another controller. This is not limited. Herein, the another controller and the controller 204 may establish a communication connection by using Bluetooth, a Zigbee protocol (Zigbee), or HUAWEI Hilink. Then, when determining that the working mode indication information is preset first mode indication information, the controller 204 may determine that the working mode of the optical transceiver apparatus 20 is the first mode. When determining that the working mode indication information is preset second mode indication information, the controller 204 may determine that the working mode of the optical transceiver apparatus is the second mode.

In a first implementation, when determining that the working mode of the optical transceiver apparatus 20 is the first mode, the controller 204 may generate and send one piece of control information (for ease of distinguishing, the following uses first control information as a substitute for description) to the optical path selector 203. Then, after receiving the first control information, the optical path selector 203 may feed back the first local oscillator optical signal and the first modulated optical signal that are received by the optical path selector 203 to the optical signal processor 202, to implement the self-loopback function of the optical transceiver apparatus 20. Further, optionally, when the optical transceiver apparatus 20 implements the self-loopback function, the optical transceiver apparatus 20 may further independently implement an operation such as function debugging or service self-detection.

In a second implementation, when determining that the working mode of the optical transceiver apparatus 20 is the second mode, the controller 204 may generate and send one piece of control information (for ease of distinguishing, the following uses second control information as a substitute for description) to the optical path selector 203. Then, after receiving the second control information, the optical path selector 203 may send the first local oscillator optical signal and the first modulated optical signal that are received by the optical path selector 203 to the transmission fiber 21 and send the first local oscillator optical signal and the first modulated optical signal to the optical transceiver apparatus 22 through the transmission fiber 21.

It should be additionally noted herein that the controller 204 may be an existing controller that is reused in the optical transceiver apparatus 20 or may be a newly added controller in the optical transceiver apparatus 20. The controller 204 can be implemented by using a framed component system or may be implemented by using a system-on-a-chip (SOC) including a single integrated chip. This is not limited.

Further, in some possible implementations, the light source 201 may output the first local oscillator optical signal and the first carrier wavelength signal that have at least two wavelengths. In this embodiment, the light source 201 may be configured to output the first local oscillator optical signal and the first carrier optical signal that have the first preset wavelength or the second preset wavelength.

Then, when determining that the working mode of the optical transceiver apparatus 20 is the second mode, the controller 204 may further determine a specified apparatus type of the optical transceiver apparatus 20. It should be noted herein that the apparatus type may include a first type and a second type. Under a restriction of different apparatus types, wavelengths of optical signals sent and received by the optical transceiver apparatus are different. For example, when the optical transceiver apparatus is set to the first type, the optical transceiver apparatus may send the first local oscillator optical signal and the first modulated optical signal that have the first preset wavelength and may receive the second local oscillator optical signal and the second modulated optical signal that have the second preset wavelength. When the optical transceiver apparatus is set to the second type, the optical transceiver apparatus may send the first local oscillator optical signal and the first modulated optical signal that have the second preset wavelength and may receive the second local oscillator optical signal and the second modulated optical signal that have the first preset wavelength. It should be noted herein that, in this embodiment, the optical transceiver apparatus 20 and the optical transceiver apparatus 22 that perform signal transmission need to be set to different apparatus types. When the optical transceiver apparatus 20 is set to a first-type optical transceiver apparatus, the optical transceiver apparatus 22 may need to be set to a second-type optical transceiver apparatus.

When the optical transceiver apparatus 20 is set to the second-type optical transceiver apparatus, the optical transceiver apparatus 22 may need to be set to the first-type optical transceiver apparatus.

In an implementation, the controller 204 may first obtain type indication information that is used to indicate the apparatus type of the optical transceiver apparatus 20. Herein, the type indication information may be obtained by the controller 204 from a user instruction received by the controller 204, or may be obtained by the controller 204 from information received by another controller that establishes a communication connection to the controller 204. This is not limited. Then, when determining that the type indication information is preset first type indication information, the controller 204 may determine that the apparatus type of the optical transceiver apparatus 20 is the first type, and may generate and send one piece of control information (for ease of distinguishing, the following uses third control information as a substitute for description) to the light source 201. After receiving the third control information, the light source 201 may output the first local oscillator optical signal and the first carrier optical signal that have the first preset wavelength. When determining that the type indication information is preset second type indication information, the controller 204 may determine that the apparatus type of the optical transceiver apparatus 20 is the second type, and may generate and send one piece of control information (for ease of distinguishing, the following uses fourth control information as a substitute for description) to the light source 201. After receiving the fourth control information, the light source 201 may output the first local oscillator optical signal and the first modulated optical signal that have the second preset wavelength.

In some possible implementations, the light source 201 may output continuous light having at least two wavelengths, and the apparatus type of the optical transceiver apparatus 20 may restrict a wavelength of continuous light output by the light source 201. In this way, only two optical transceiver apparatuses 20 may be used to implement a complete optical communications system. Therefore, in an actual development and production process, only one optical transceiver apparatus whose light source can output continuous light having at least two wavelengths needs to be developed and produced. Compared with the conventional technology in which at least two optical transceiver apparatuses that can be paired for use need to be developed and produced, in this embodiment, development and production costs can be greatly reduced, and applicability and practicality of the optical transceiver apparatus can be significantly improved.

Figure 5:
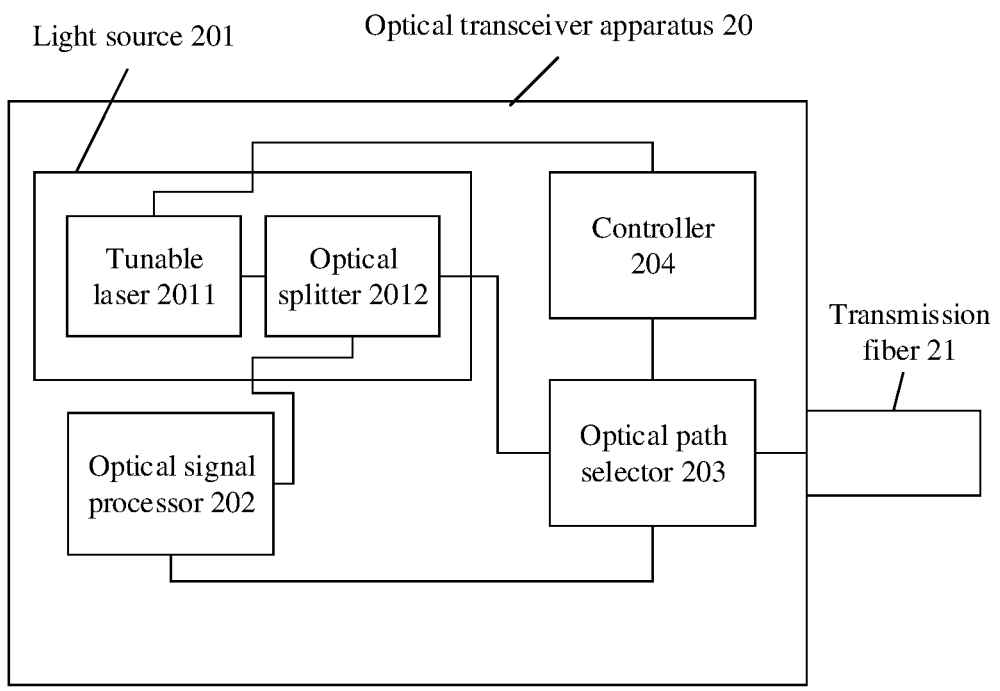
FIG. 5 is another schematic diagram of a structure of an optical transceiver apparatus according to an embodiment.

Further, in a first optional implementation, FIG. 5 is another schematic diagram of a structure of an optical transceiver apparatus according to an embodiment. As shown in FIG. 5, the light source 201 may include a tunable laser 2011 and an optical splitter 2012. The tunable laser 2011 may be configured to output continuous light having the first preset wavelength or the second preset wavelength. The optical splitter 2012 may be configured to split input continuous light. One port of the tunable laser 2011 may be connected to the controller 204 through a port on the light source 201 and another port of the tunable laser 2011 may be connected to an input port of the optical splitter 2012. The optical splitter 2012 has at least two output ports (which are assumed to be a first output port and a second output end), the first output port is connected to the optical path selector 203, and the second output port is connected to the optical signal processor 202. After receiving the third control information, the light source 201 transmits the third control information to the tunable laser 2011. When receiving the third control information, the tunable laser 2011 may generate and transmit continuous light having the first preset wavelength to the input port of the optical splitter 2012. After receiving the continuous light having the first preset wavelength, the optical splitter 2012 may split the continuous light, to obtain the first local oscillator optical signal and the first carrier optical signal that have the first preset wavelength. Then, the optical splitter 2012 may transmit the first local oscillator optical signal having the first preset wavelength to the optical path selector 203 through the first output port of the optical splitter 2012, and transmit the first carrier optical signal having the first preset wavelength to the optical signal processor 202 through the second output port of the optical splitter 2012. Alternatively, when receiving the fourth control information, the light source 201 may transmit the fourth control information to the tunable laser 2011. After receiving the fourth control information, the tunable laser 2011 may generate and transmit continuous light having the second preset wavelength to the input port of the optical splitter 2012. After receiving the continuous light having the second preset wavelength, the optical splitter 2012 may split the continuous light, to obtain the first local oscillator optical signal and the first carrier optical signal that have the second preset wavelength. Then, the optical splitter 2012 may transmit the first local oscillator optical signal having the second preset wavelength to the optical path selector 203 through the first output port of the optical splitter 2012, and transmit the first carrier optical signal having the second preset wavelength to the optical signal processor 202 through the second output port of the optical splitter 2012. Herein, the tunable laser and the optical splitter form a light source that can output continuous light having at least two wavelengths, so that the light source has a simple structure and stable performance, to facilitate development and production of the light source, and improve applicability of the optical transceiver apparatus.

Figure 6:
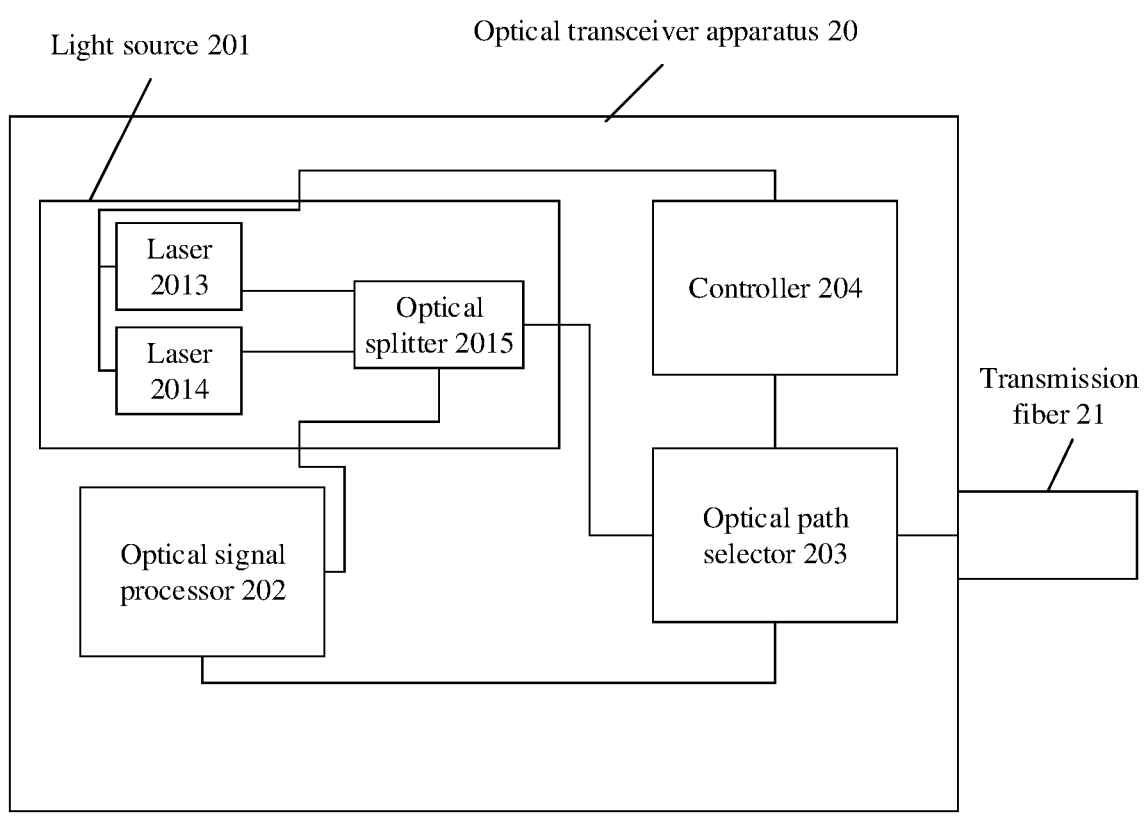
FIG. 6 is another schematic diagram of a structure of an optical transceiver apparatus according to an embodiment.

In a second optional implementation, FIG. 6 is another schematic diagram of a structure of an optical transceiver apparatus according to an embodiment. As shown in FIG. 6, the light source 201 may include a laser 2013, a laser 2014, and an optical splitter 2015. The laser 2013 may be configured to output continuous light having the first preset wavelength. The laser 2014 may be configured to output continuous light having the second preset wavelength. The optical splitter 2015 includes at least two input ports (which are assumed to be a first input port and a second input port) and two output ports (which are assumed to be a third output port and a fourth output port) and may be configured to split input continuous light. One port of the laser 2013 and one port of the laser 2014 may be connected to the controller 204 through one port of the light source 201. Another port of the laser 2013 is connected to the first input port of the optical splitter 2015. Another port of the laser 2014 is connected to the second input port of the optical splitter 2015. The third output port of the optical splitter 2015 is connected to the optical path selector 203, and the fourth output port of the optical splitter 2015 is connected to the optical signal processor 202. When receiving the third control information, the light source 201 transmits the third control information to the laser 2013. After receiving the third control information, the laser 2013 may generate and transmit continuous light having the first preset wavelength to the first input port of the optical splitter 2015. Then, after receiving the continuous light having the first preset wavelength, the optical splitter 2015 may split the continuous light, to obtain the first local oscillator optical signal and the first carrier optical signal that have the first preset wavelength. Then, the optical splitter 2015 may transmit the first local oscillator optical signal having the first preset wavelength to the optical path selector 203 through the third output port of the optical splitter 2015, and transmit the first carrier optical signal having the first preset wavelength to the optical signal processor 202 through the fourth output port of the optical splitter 2015. Alternatively, when the receiving the fourth control information, the light source 201 transmits the fourth control information to the laser 2013. After receiving the fourth control information, the laser 2013 may generate continuous light having the second preset wavelength, and transmit the continuous light having the second preset wavelength to the second input port of the optical splitter 2015. Then, after receiving the continuous light having the second preset wavelength, the optical splitter 2015 may split the continuous light, to obtain the first local oscillator optical signal and the first carrier optical signal that have the second preset wavelength. Then, the optical splitter 2015 may transmit the first local oscillator optical signal having the second preset wavelength to the optical path selector 203 through the third output port of the optical splitter 2015, and transmit the first carrier optical signal having the second preset wavelength to the optical signal processor 202 through the fourth output port of the optical splitter 2015. It should be noted herein that, to reduce signal interference and save energy, in an actual use process, only one of the laser 2013 and the laser 2014 may be in a working state at a same moment. After the light source 201 receives the third control information, the laser 2013 may be in a working state, and the laser 2014 may be in a disabled state. After the light source 201 receives the fourth control information, the laser 2013 is in a disabled state, and the laser 2014 is in a working state. Herein, at least two lasers with low costs and one optical splitter form a light source that can output continuous light having at least two wavelengths, to reduce development and production costs of the light source, thereby improving practicality of an optical transceiver apparatus.

Figure 7:
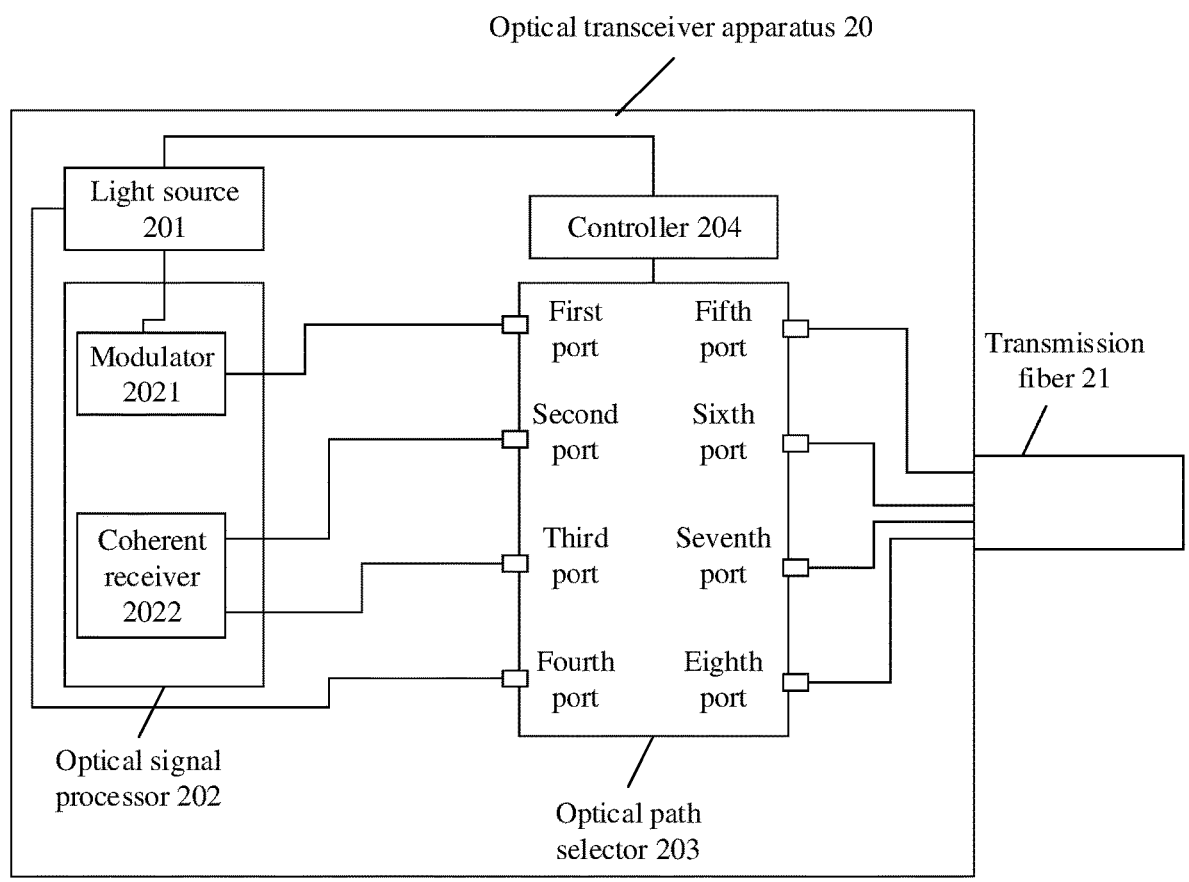
FIG. 7 is another schematic diagram of a structure of an optical transceiver apparatus according to an embodiment.

Further, in a possible implementation, FIG. 7 is another schematic diagram of a structure of an optical transceiver apparatus according to an embodiment. As shown in FIG. 7, the optical signal processor 202 may include a modulator 2021 and a coherent receiver 2022. The modulator 2021 is configured to perform optical modulation on the input carrier optical signal based on a baseband signal, to obtain a corresponding modulated optical signal. The coherent receiver 2022 is configured to: receive a local oscillator optical signal and a modulated optical signal, and demodulate the modulated optical signal based on the local oscillator optical signal, to obtain a corresponding baseband signal and a corresponding carrier optical signal. The modulator 2021 includes at least one carrier input port and a modulated signal output port. The coherent receiver 2022 includes at least one local oscillator optical input port and a signal optical input port. The optical path selector 203 may include a first port, a second port, a third port, a fourth port, a fifth port, a sixth port, a seventh port, and an eighth port. The optical path selector 203 may be configured to establish an optical connection between any two ports in the first port, the second port, the third port, the fourth port, the fifth port, the sixth port, the seventh port, and the eighth port. In an implementation, as shown in FIG. 7, the carrier input port of the modulator 2021 is connected to the light source 201, and the modulated signal output port of the modulator 2021 is connected to the first port of the optical path selector 203. The signal optical input port of the coherent receiver 2022 is connected to the second port of the optical path selector 203, and the local oscillator optical input port of the coherent receiver 2022 is connected to the third port of the optical path selector 203. The fourth port of the optical path selector 203 is connected to the light source 201. The fifth port, the sixth port, the seventh port, and the eighth port of the optical path selector 203 are separately connected to the transmission fiber 21.

When it is determined that the working mode of the optical transceiver apparatus 20 is the first mode, the optical path selector 203 receives the first control information sent by the controller 204. Then, the optical path selector 203 may establish an optical connection between the first port and the second port, and establish an optical connection between the third port and the fourth port. Then, the first carrier optical signal output by the light source 201 is input to the modulator 2021. The modulator 2021 performs optical modulation on the first carrier optical signal by using the baseband signal, to obtain the first modulated optical signal, and transmits the first modulated optical signal to the first port. Then, the optical path selector 203 may transmit the first modulated optical signal to the signal optical input port of the coherent receiver 2022 through the second port. In addition, the first local oscillator optical signal output by the light source 201 may also be input to the optical path selector 203 through the fourth port, and then the optical path selector 203 transmits the first local oscillator optical signal to the local oscillator optical input port of the coherent receiver 2022 through the third port. Herein, the first local oscillator optical signal output by the light source 201 and the first modulated optical signal output by the modulator 2021 are finally returned to the coherent receiver 2022 by using the optical path selector 203, thereby implementing a closed-loop function of the optical transceiver apparatus.

When it is determined that the working mode of the optical transceiver apparatus 20 is the second mode, the optical path selector 203 may receive the second control information sent by the controller 204. Then, the optical path selector 203 may separately establish optical connections between each of the first port and the fourth port and any two ports in the four ports in the fifth port, the sixth port, the seventh port, and the eighth port. It should be noted herein that the first port and the fourth port are respectively connected to only one of the fifth port, the sixth port, the seventh port, and the eighth port, and ports connected to the first port and the fourth port are also different.

For ease of subsequent description, it is currently assumed that the optical path selector 203 separately establishes an optical connection between the first port and the fifth port and an optical connection between the fourth port and the eighth port. The first carrier optical signal output by the light source 201 is input to the modulator 2021. The modulator 2021 performs optical modulation on the first carrier optical signal by using the baseband signal, to obtain the first modulated optical signal, and transmits the first modulated optical signal to the first port. Then, the optical path selector 203 may transmit the first modulated optical signal to the transmission fiber 21 through the fifth port. The transmission fiber 21 may transmit the first modulated optical signal to the optical transceiver apparatus 22. In addition, the first local oscillator optical signal output by the light source 201 may also be input to the optical path selector 203 through the fourth port, and then the optical path selector 203 transmits the first local oscillator optical signal to the transmission fiber 21 through the eighth port. The transmission fiber 21 may transmit the first local oscillator optical signal to the optical transceiver apparatus 22. Herein, the first local oscillator optical signal output by the light source 201 and the first modulated optical signal output by the modulator 2021 are transmitted to the transmission fiber 21 by using the optical path selector 203, and are finally transmitted to the optical transceiver apparatus 22, thereby implementing a process in which the optical transceiver apparatus 20 sends an optical signal to the optical transceiver apparatus 22.

Optionally, when the optical transceiver apparatus 20 works in a bidirectional transmission scenario, the optical path selector 203 may further separately establish optical connections between each of the second port and the third port and two ports other than the any two ports in the four ports in the fifth port, the sixth port, the seventh port, and the eighth port, to transmit, to the optical signal processor through the second port and the third port, the second local oscillator optical signal and the second modulated optical signal that are received by the two ports. Herein, with reference to the foregoing descriptions of the fifth port and the eighth port, it is assumed that the optical path selector 203 receives the second modulated optical signal from the transmission fiber 21 through the sixth port, and receives the second local oscillator optical signal from the transmission fiber 21 through the seventh port. When an optical connection is established between the first port and the fifth port, and an optical connection is between the fourth port and the eighth port, the optical path selector 203 may further establish an optical connection between the second port and the sixth port and an optical connection between the third port and the seventh port. Then, the optical path selector 203 may transmit the second modulated optical signal received by the optical path selector 203 to the coherent receiver 2022 through the second port, and transmit the second local oscillator optical signal received by the optical path selector 203 to the coherent receiver 2022 through the third port. Then, the coherent receiver 2002 may demodulate the second modulated optical signal based on the second local oscillator optical signal, to receive an optical signal sent by the optical transceiver apparatus 22.

Figure 8:
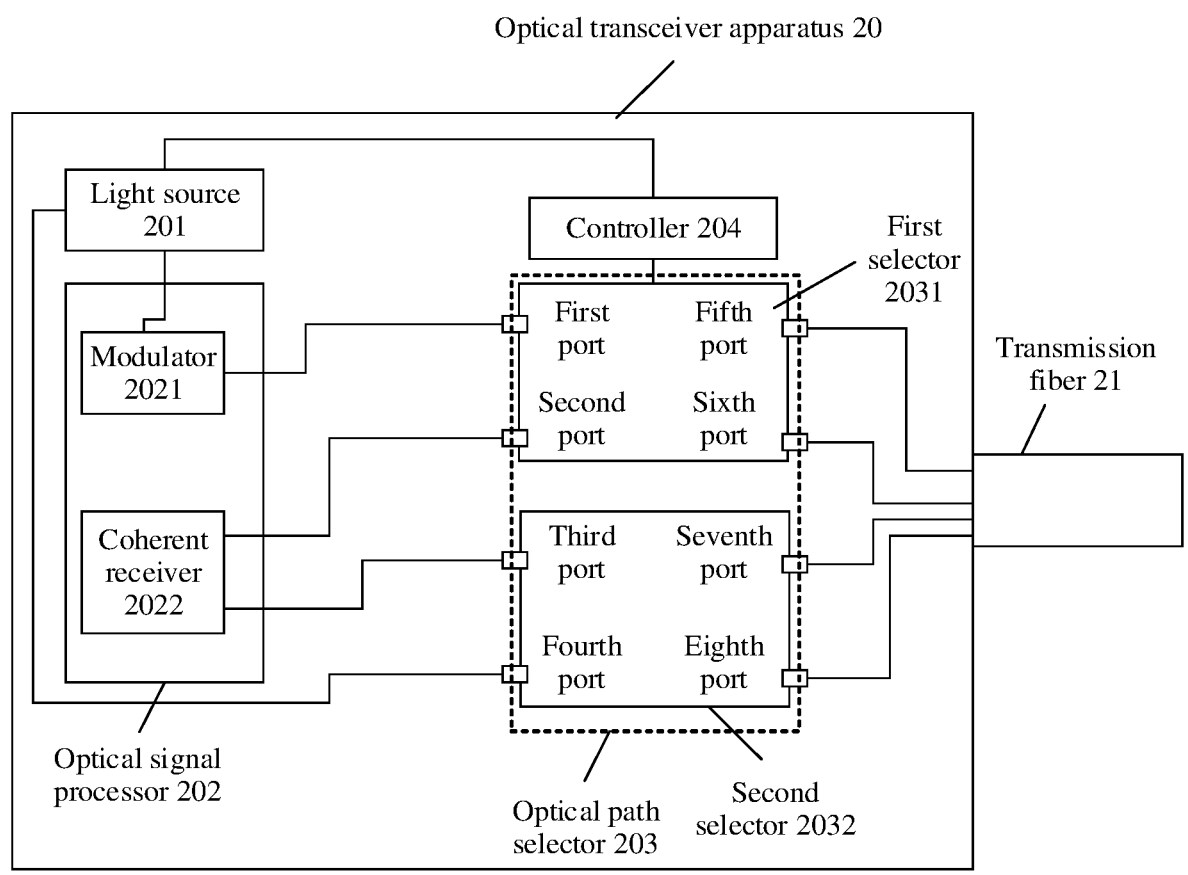
FIG. 8 is another schematic diagram of a structure of an optical transceiver apparatus according to an embodiment.

Alternatively, in another possible implementation, FIG. 8 is another schematic diagram of a structure of an optical transceiver apparatus according to an embodiment. It should be noted herein that a difference between the optical transceiver apparatuses shown in FIG. 7 and FIG. 8 lie in different structures of optical path selectors 203. The optical path selector 203 shown in FIG. 7 is an integral module, and the optical path selector 203 shown in FIG. 8 includes a first selector 2031 and a second selector 2032 that are separated from each other. Therefore, in an implementation shown in FIG. 8, for a function and a structure of a module in the optical transceiver apparatus 20 other than the optical path selector 203, refer to the foregoing descriptions of the optical transceiver apparatus shown in FIG. 7. Details are not described herein again. As shown in FIG. 8, the first selector 2031 includes a first port, a second port, a fifth port, and a sixth port. The first port is connected to the modulated signal output port of the modulator 2021, the second port is connected to the signal optical input port of the coherent receiver 2022, and the fifth port and the sixth port are connected to the transmission fiber 21. The second selector 2032 includes a third port, a fourth port, a seventh port, and an eighth port. The third port is connected to the local oscillator optical input port of the coherent receiver 2022, the fourth port is connected to the light source 201, and the seventh port and the eighth port are connected to the transmission fiber 21. The first selector 2031 may establish an optical connection between any two ports in the first port, the second port, the fifth port, and the sixth port. The second selector 2032 may establish an optical connection between any two ports in the third port, the fourth port, the seventh port, and the eighth port.

In an implementation, when it is determined that the working mode of the optical transceiver apparatus 20 is the first mode, the optical path selector 203 receives the first control information sent by the controller 204. Then, the first selector 2031 may establish an optical connection between the first port and the second port, and the second selector 2032 may establish an optical connection between the third port and the fourth port. Then, the first modulated optical signal output by the modulator 2021 is transmitted to the first port. Then, the first selector 2031 may transmit the first modulated optical signal to the signal optical input port of the coherent receiver 2022 through the second port. In addition, the first local oscillator optical signal output by the light source 201 is sent to the second selector 2032 through the fourth port, and the second selector 2032 transmits the first local oscillator optical signal to the coherent receiver 2022 through the third port, to implement the closed-loop function of the optical transceiver apparatus.

Alternatively, when it is determined that the working mode of the optical transceiver apparatus 20 is the second mode, the optical path selector 203 may receive the second control information sent by the controller 204. Then, the first selector 2031 may establish an optical connection between the first port and the fifth port or an optical connection between the first port and the sixth port, and the second selector 2032 may establish an optical connection between the fourth port and the seventh port or an optical connection between the fourth port and the eighth port. Herein, for ease of subsequent description, it is currently assumed that the first port is connected to the fifth port, and the fourth port is connected to the eighth port. The modulator 2021 may transmit the modulated first modulated optical signal to the first port. Then, the first selector 2031 may transmit the first modulated optical signal to the transmission fiber 21 through the fifth port. The transmission fiber 21 may transmit the first modulated optical signal to the optical transceiver apparatus 22. In addition, the first local oscillator optical signal output by the light source 201 may also be input to the second selector 2032 through the fourth port, and then the second selector 2032 transmits the first local oscillator optical signal to the transmission fiber 21 through the eighth port. The transmission fiber 21 may transmit the first local oscillator optical signal to the optical transceiver apparatus 22. Herein, the first local oscillator optical signal output by the light source 201 and the first modulated optical signal output by the modulator 2021 are transmitted to the transmission fiber 21 by using the first selector 2031 and the second selector 2032, and are finally transmitted to the optical transceiver apparatus 22, thereby implementing a process in which the optical transceiver apparatus 20 sends an optical signal to the optical transceiver apparatus 22.

Optionally, in some implementations, the optical path selector 203 may be implemented by using an optical waveguide, a silicon optical waveguide, an MEMS, or another functional device. This is not limited in this embodiment.

Figure 9:
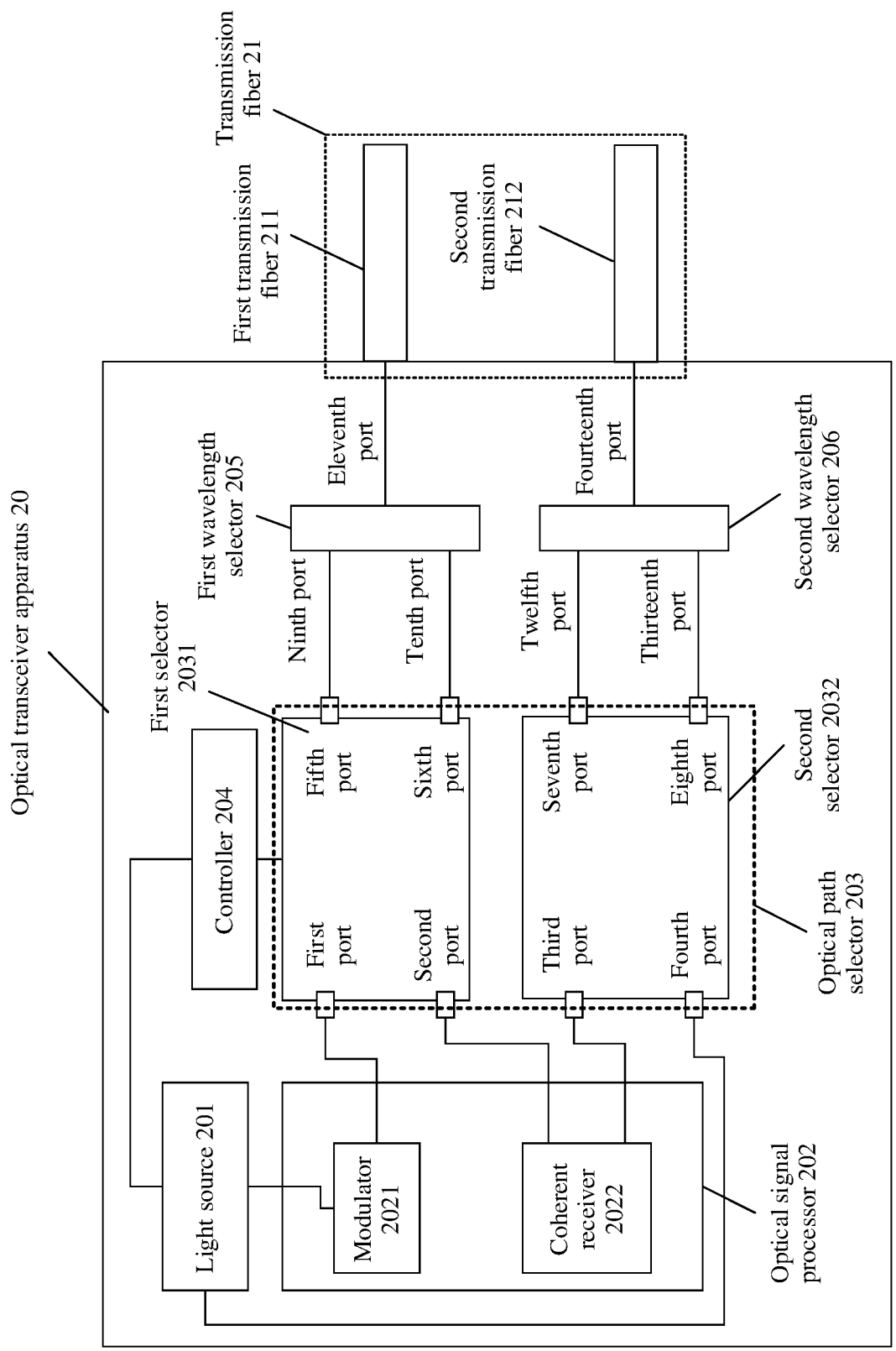
FIG. 9 is another schematic diagram of a structure of an optical transceiver apparatus according to an embodiment.

In some possible implementations, FIG. 9 is another schematic diagram of a structure of an optical transceiver apparatus according to an embodiment. As shown in FIG. 9, the optical transceiver apparatus 20 may further include a first wavelength selector 205 and a second wavelength selector 206. Optionally, the first wavelength selector 205 and the second wavelength selector 206 may be a wavelength division multiplexer or a wavelength selective switch.

The transmission fiber 21 may include a first transmission fiber 211 and a second transmission fiber 212. The first wavelength selector 205 includes at least three ports (which are assumed to be a ninth port, a tenth port, and an eleventh port), and the second wavelength selector 206 includes at least three ports (which are assumed to be a twelfth port, a thirteenth port, and a fourteenth port). The fifth port is connected to the ninth port, the sixth port is connected to the tenth port, and the eleventh port is connected to the first transmission fiber 211. The seventh port is connected to the twelfth port, the eighth port is connected to the thirteenth port, and the fourteenth port is connected to the second transmission fiber 212. The first wavelength selector 205 may be configured to separate an optical signal transmitted between the fifth port and the first transmission fiber 211 and an optical signal transmitted between the sixth port and the first transmission fiber 211 that have different wavelengths. The second wavelength selector may be configured to separate an optical signal transmitted between the seventh port and the second transmission fiber 212 and an optical signal transmitted between the eighth port and the second transmission fiber 212 that have different wavelengths.

With reference to the foregoing example in which a signal is input to each port of the optical path selector 203 in the second mode, the fifth port may transmit the first modulated optical signal to the ninth port, then the first wavelength selector 205 may transmit the first modulated optical signal to the first transmission fiber 211 through the eleventh port, and then the first transmission fiber 211 transmits the first modulated optical signal to the optical transceiver apparatus 22. In addition, the eighth port transmits the first local oscillator optical signal to the thirteenth port, the second wavelength selector 206 transmits the first local oscillator optical signal to the second transmission fiber 212 through the fourteenth port, and the second transmission fiber 212 may transmit the first local oscillator optical signal to the optical transceiver apparatus 22. Similarly, when the second local oscillator optical signal and the second modulated optical signal from the optical transceiver apparatus 22 are also transmitted on the transmission fiber 21, if the second modulated optical signal is transmitted on the first transmission fiber 211 and the second local oscillator optical signal is transmitted on the second transmission fiber 212, the first wavelength selector 205 may receive the second modulated optical signal through the eleventh port, and send the second modulated optical signal to the sixth port through the tenth port. In addition, the second wavelength selector 206 may also receive the second local oscillator optical signal through the fourteenth port, and send the second local oscillator optical signal to the seventh port through the twelfth port.

It should be additionally noted herein that, in a bidirectional transmission scenario, the first wavelength selector 205 may be configured to separate the first modulated optical signal from the second modulated optical signal, to avoid mutual interference between the two optical signals. The second wavelength selector 206 may be configured to separate the first local oscillator optical signal from the second local oscillator optical signal, to avoid mutual interference between the two optical signals. In addition, in some optional implementations, for the first wavelength selector 205, wavelengths of optical signals that may pass through the ninth port and the tenth port may be constrained to an extent. For the second wavelength selector 206, wavelengths of optical signals that may pass through the twelfth port and the thirteenth port may also be constrained to an extent. For example, wavelengths of optical signals that may pass through the ninth port may be limited to a first wavelength range, and wavelengths of optical signals that may pass through the tenth port may be limited to a second wavelength range. Wavelengths of optical signals that may pass through the twelfth port may be limited to the second wavelength range, and wavelengths of optical signals that may pass through the thirteenth port may be limited to the first preset wavelength range. It is currently assumed that the first preset wavelength is in the first wavelength range and the second preset wavelength is in the second wavelength range. When a wavelength is limited on the ninth port, the tenth port, the eleventh port, and the twelfth port, and the apparatus type of the optical transceiver apparatus 20 is switched between the first type and the second type, the first wavelength selector 2031 and the second wavelength selector 2032 need to adjust connection relationships between each of four ports including the first port, the second port, the third port, and the fourth port and each of four ports including the fifth port, the sixth port, the seventh port, and the eighth port, to ensure normal transmission of an optical signal between the optical path selector 203 and the transmission fiber 21. For example, when the apparatus type of the optical transceiver apparatus 20 is the first type, the first selector 2031 may establish an optical connection between the first port and the fifth port, so that the first modulated optical signal having the first preset wavelength can be sent to the ninth port through the fifth port. When the apparatus type of the optical transceiver apparatus 20 is changed from the first type to the second type, the first selector 2031 needs to establish an optical connection between the first port and the sixth port, so that the first modulated optical signal having the second preset wavelength may be transmitted to the tenth port through the sixth port. In this implementation, the optical path selector 203 is separately connected to two transmission fibers by using two wavelength selectors, so that the optical transceiver apparatus may be applicable to a dual-fiber transmission scenario, and applicability of the optical transceiver apparatus can be improved.

Figure 10:
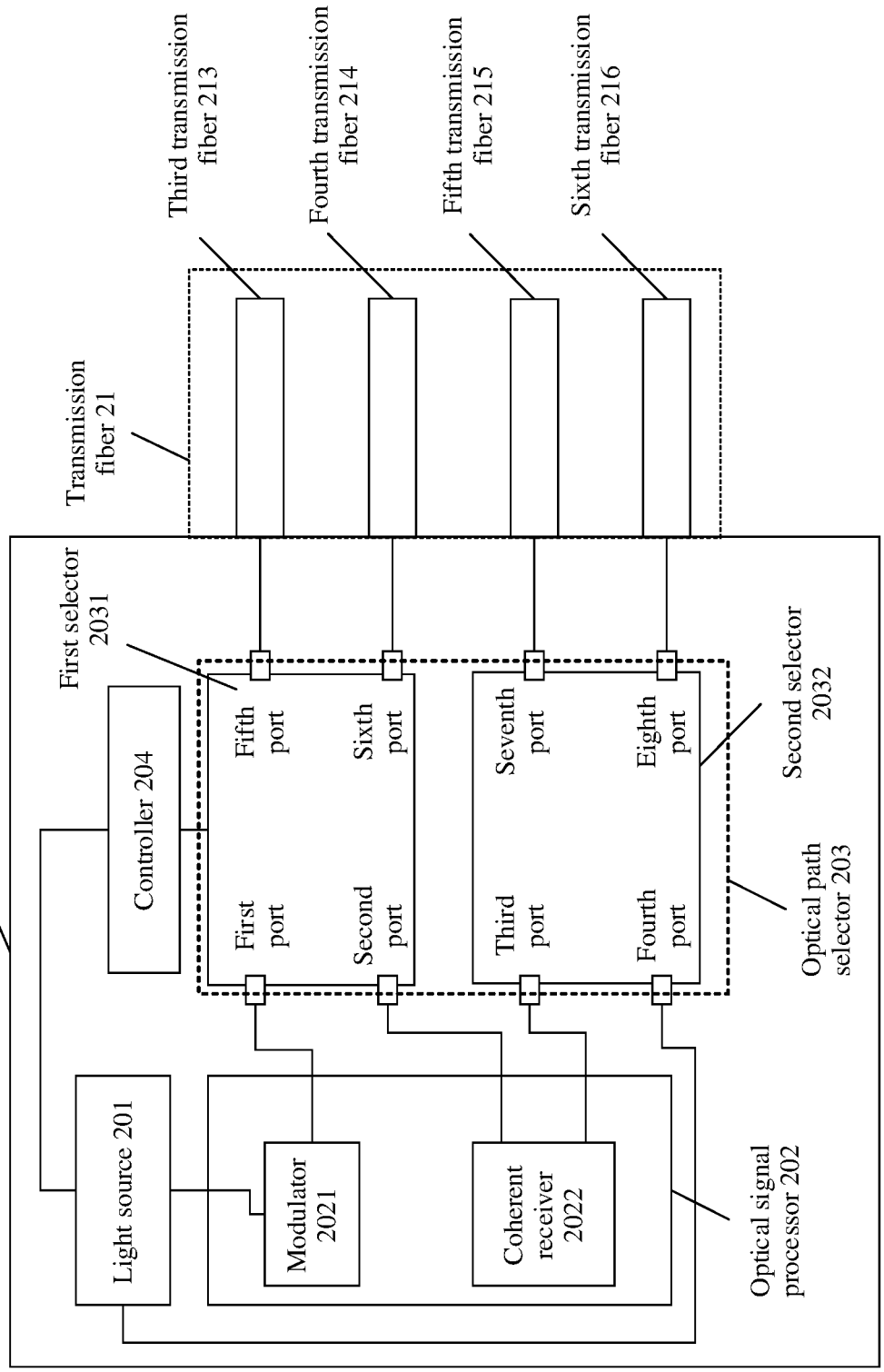
FIG. 10 is another schematic diagram of a structure of an optical transceiver apparatus according to an embodiment.

In some possible implementations, FIG. 10 is another schematic diagram of a structure of an optical transceiver apparatus according to an embodiment. As shown in FIG. 10, the transmission fiber 21 may include a third transmission fiber 213, a fourth transmission fiber 214, a fifth transmission fiber 215, and a sixth transmission fiber 216. The fifth port is connected to the third transmission fiber 213, the sixth port is connected to the fourth transmission fiber 214, the seventh port is connected to the fifth transmission fiber 215, and the eighth port is connected to the sixth transmission fiber 216. In an actual bidirectional transmitting and sending process, with reference to the foregoing example in which a signal is input to each port of the optical path selector 203 in the second mode, the fifth port transmits the first modulated optical signal to the third transmission fiber 213, and the third transmission fiber 213 may transmit the first modulated optical signal to the optical transceiver apparatus 22. The eighth port transmits the first local oscillator optical signal to the sixth transmission fiber 216, and then the sixth transmission fiber 216 may transmit the first local oscillator optical signal to the optical transceiver apparatus 22. Similarly, when the second local oscillator optical signal and the second modulated optical signal from the optical transceiver apparatus 22 are also transmitted on the transmission fiber 21, if the second modulated optical signal is transmitted on the fourth transmission fiber 214 and the second local oscillator optical signal is transmitted on the fifth transmission fiber 215, the first selector 2031 may receive the second modulated optical signal through the sixth port, and send the second modulated optical signal to the coherent receiver 2022 through the second port. In addition, the second selector 2032 may also receive the second local oscillator optical signal through the seventh port, and send the second local oscillator optical signal to the coherent receiver 2022 through the third port. In this implementation, the optical path selector 203 is directly connected to the four transmission fibers, so that the optical transceiver apparatus may be applicable to a four-fiber transmission scenario, and applicability of the optical transceiver apparatus can be improved.

It should be noted that a structure shown in FIG. 8 is used as a structure of the optical path selector 203 shown in FIG. 9 or FIG. 10. This is merely an example used to avoid repetition. The structure of the optical path selector shown in FIG. 7 may alternatively be used. This is not limited herein.

It should be further noted that, for the optical communications system 200 provided in this embodiment, the optical transceiver apparatus 20 and the optical transceiver apparatus 22 included in the optical communications system 200 may have similar internal structures and working principles, and a main difference lies in that different apparatus types need to be used when the optical transceiver apparatus 20 and the optical transceiver apparatus 22 perform bidirectional transmission. When the optical transceiver apparatus 20 is set to the first type, the optical transceiver apparatus 22 may need be set to the second type, and vice versa. In this way, the optical transceiver apparatus 20 can send the first local oscillator optical signal and the first modulated optical signal to the optical transceiver apparatus 22 and receive the second local oscillator optical signal and the second modulated optical signal. In addition, the optical transceiver apparatus 22 can send the second local oscillator optical signal and the second modulated optical signal to the optical transceiver apparatus 20 and receive the first local oscillator optical signal and the first modulated optical signal. Herein, because the optical transceiver apparatus 22 and the optical transceiver apparatus 20 have similar structures and working principles, a structure and a working principle of the optical transceiver apparatus 22 are not repeatedly described in this embodiment. For details, refer to the foregoing structure and working principle of the optical transceiver apparatus 20.

In addition, it should be further understood that, in an actual use process, a connection relationship between each port of the optical path selector 203 and each of the light source 201, the optical signal processor 202, and the transmission fiber 21 may change based on an actual requirement. For example, the first port may alternatively be connected to the light source 201, and the second port may alternatively be connected to the modulator 2021. As the connection relationship between each port of the optical path selector 203 and each of the light source 201, the optical signal processor 202, and the transmission fiber 21 changes, a function of each port of the optical path selector 203 also changes correspondingly. For example, if the first port is connected to a local oscillator optical output port of the light source 201, the first port may be configured to receive the first local oscillator optical signal. Therefore, the description of the connection relationship between each port of the optical path selector 203 and each of the light source 201, the optical signal processor 202, and the transmission fiber 21 in this embodiment is merely an example and does not impose a limitation.

In this embodiment, the optical transceiver apparatus 20 flexibly controls directions of the first modulated optical signal and the first local oscillator optical signal by using the optical path selector 203 inside the optical transceiver apparatus 20, so that the first modulated optical signal and the first local oscillator optical signal can be transmitted to the outside of the optical transceiver apparatus 20 through the transmission fiber 21, to implement a signal transmission function of the optical transceiver apparatus 20, and can be transmitted to the optical signal processor 202 inside the optical transceiver apparatus 20, to implement a self-loopback function, thereby improving applicability and practicability of the optical transceiver apparatus.

Embodiment 2

Figure 11:
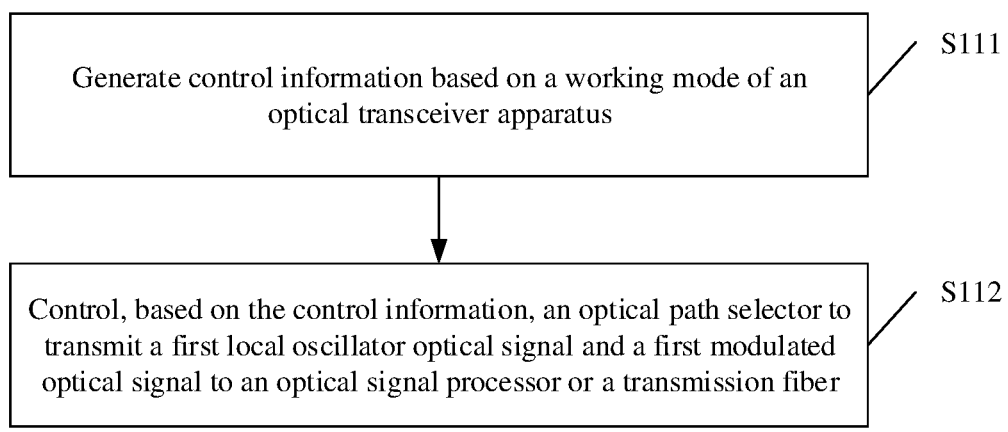
FIG. 11 is a schematic flowchart of an optical signal processing method according to an embodiment.

FIG. 11 is a schematic flowchart of an optical signal processing method according to an embodiment. The optical signal processing method is applicable to the optical transceiver apparatus 20 and the optical transceiver apparatus 22 described in Embodiment 1 and may be performed by controllers in the optical transceiver apparatus 20 and the optical transceiver apparatus 22. Herein, structures of the optical transceiver apparatus 20 and the optical transceiver apparatus 22 and a function of each structure are described in Embodiment 1. In addition, the optical transceiver apparatus 20 and the optical transceiver apparatus 22 have a same structure and working principle. In this embodiment, the optical transceiver apparatus 20 is used as an example to describe an execution process of the optical signal processing method. As shown in FIG. 11, the method includes the following steps.

S111: Generate control information based on a working mode of an optical transceiver apparatus.

In some possible implementations, a controller 204 in the optical transceiver apparatus 20 may first generate corresponding control information based on a working mode of the optical transceiver apparatus 20. In an implementation, the controller 204 may first determine the working mode of the optical transceiver apparatus 20. Herein, the working mode of the optical transceiver apparatus 20 may include a first mode and a second mode. For a process in which the controller 204 determines the working mode of the optical transceiver apparatus 20, refer to the process of determining the working mode of the optical transceiver apparatus 20 in Embodiment 1. Details are not described herein again. When determining that the working mode of the optical transceiver apparatus 20 is the first mode, the controller 204 may generate first control information. When determining that the working mode of the optical transceiver apparatus 20 is the second mode, the controller 204 may generate second control information. It should be noted herein that the controller 204 may be an existing controller that is reused in the optical transceiver apparatus 20 or may be a newly added controller in the optical transceiver apparatus 20. The controller 204 may be implemented by using a framed component system or may be implemented by using a system-on-a-chip including a single integrated chip. This is not limited.

S112: Control, based on the control information, an optical path selector to transmit a first local oscillator optical signal and a first modulated optical signal to an optical signal processor or a transmission fiber.

In some possible implementations, after generating the control information, the controller 204 may further control, based on the control information, an optical path selector 203 to transmit the first local oscillator optical signal and the first modulated optical signal to an optical signal processor 202 or a transmission fiber 21.

In an implementation, after generating the first control information or the second control information, the controller 204 may send the first control information or the second control information to the optical path selector 203. After receiving the first control information, the optical path selector 203 may transmit the first local oscillator optical signal and the first modulated optical signal to the optical signal processor 202. Alternatively, after receiving the second control information, the optical path selector 203 may transmit the first local oscillator optical signal and the first modulated optical signal to the transmission fiber 21. Herein, for a process in which the optical path selector 203 transmits the first local oscillator optical signal and the first modulated optical signal to the optical signal processor 202 or the transmission fiber 21 based on the first control information or the second control information, refer to the process described in Embodiment 1. Details are not described herein again.

Optionally, when the optical transceiver apparatus 20 works in a bidirectional transmission scenario, the optical path selector 203 may further receive, from the transmission fiber 21, a second local oscillator optical signal and a second modulated optical signal from the optical transceiver apparatus 22 and transmit the second local oscillator optical signal and the second modulated optical signal to the optical signal processor 202. For a process, refer to the process described in Embodiment 1. Details are not described herein again.

Optionally, a light source 201 in the optical transceiver apparatus 20 may output a first local oscillator optical signal and a first carrier wavelength signal that have at least two wavelengths. Herein, it is assumed that the light source 201 may be configured to output the first local oscillator optical signal and the first carrier optical signal that have a first preset wavelength or a second preset wavelength. In this case, when determining that the working mode of the optical transceiver apparatus 20 is the second mode, the controller 204 may further determine a specified apparatus type of the optical transceiver apparatus 20. Herein, the apparatus type may include a first type and a second type. Under a restriction of different apparatus types, wavelengths of optical signals sent and received by the optical transceiver apparatus are different. Herein, it is assumed that the optical transceiver apparatus of the first type may send the first local oscillator optical signal and the first modulated optical signal that have the first preset wavelength and may receive the second local oscillator optical signal and the second modulated optical signal that have the second preset wavelength. The optical transceiver apparatus of the second type may send the first local oscillator optical signal and the first modulated optical signal that have the second preset wavelength, and may receive the second local oscillator optical signal and the second modulated optical signal that have the first preset wavelength. For a process in which the controller 204 determines the apparatus type of the optical transceiver apparatus, refer to the process of determining the apparatus type of the optical transceiver apparatus 20 in Embodiment 1. Details are not described herein again. If the controller 204 determines that the apparatus type of the optical transceiver apparatus 20 is the first type, the controller 204 may generate third control information, and send the third control information to the light source 201. After receiving the third control information, the light source 201 may output the first local oscillator optical signal and the first carrier optical signal that have the first preset wavelength. If the controller 204 determines that the apparatus type of the optical transceiver apparatus 20 is the second type, the controller 204 may generate fourth control information, and send the fourth control information to the light source 201. After receiving the fourth control information, the light source 201 may output the first local oscillator optical signal and the first carrier optical signal that have the second preset wavelength. Herein, for different structures of the light source 201 and a process of outputting, based on the third control information or the fourth control information, the first local oscillator optical signal and the first modulated optical signal that have a corresponding wavelength, refer to the corresponding process described in Embodiment 1. Details are not described herein again.

In this embodiment, the optical transceiver apparatus may control the optical path selector by using the controller, so that the optical path selector can feed back, to the signal processor, the first local oscillator optical signal and the first modulated optical signal that are generated by the light source and the optical signal processor or transmit the first local oscillator optical signal and the first modulated optical signal to the transmission fiber, so that the optical transceiver apparatus can transmit and receive an optical signal and implement a self-loopback function, thereby improving applicability and practicability of the optical transceiver apparatus.

In the foregoing implementations, the objectives, solutions, and beneficial effects are further described in detail. It should be understood that the foregoing descriptions are merely implementations, but any modification, equivalent replacement, improvement, or the like made shall fall within the scope of the embodiments.

What is claimed is:

1. An optical transceiver apparatus, comprising:
    a light source configured to provide a first local oscillator optical signal and a first carrier optical signal;
    an optical signal processor configured to modulate the first carrier optical signal and output a first modulated optical signal; and
    an optical path selector configured to transmit the first local oscillator optical signal and the first modulated optical signal to the optical signal processor or a transmission fiber configured to transmit an optical signal to an outside of the optical transceiver apparatus, wherein the light source is separately connected to the optical signal processor and the optical path selector, and the optical signal processor is connected to the optical path selector;
    wherein the optical path selector is further configured to receive, from the transmission fiber, a second local oscillator optical signal and a second modulated signal that are from an opposite optical transceiver apparatus, and transmit the second local oscillator optical signal and the second modulated signal to the optical signal processor, wherein wavelengths of the second local oscillator optical signal and the first local oscillator optical signal are different, and wavelengths of the second modulated optical signal and the first modulated optical signal are different; and
    a controller connected to the optical path selector, wherein the controller is configured to:
        when determining that a working mode of the optical transceiver apparatus is a first mode, generate and send first control information to the optical path selector, wherein the first control information is used to control the optical path selector to transmit the first local oscillator optical signal and the first modulated optical signal to the optical signal processor; and
        when determining that the working mode of the optical transceiver apparatus is a second mode, generate and send second control information to the optical path selector, wherein the second control information is used to control the optical path selector to transmit the first local oscillator optical signal and the first modulated optical signal to the transmission fiber, and transmit the second local oscillator optical signal and the second modulated optical signal to the optical signal processor.

2. The optical transceiver apparatus according to claim 1, wherein when the working mode of the optical transceiver apparatus is the second mode,
    when determining that an apparatus type of the optical transceiver apparatus is a first type, the controller is further configured to generate and send third control information to the light source, and the light source is configured to: after receiving the third control information, output the first local oscillator optical signal and the first carrier optical signal that have a first preset wavelength; and
    when determining that the apparatus type of the optical transceiver apparatus is a second type, the controller is further configured to generate and send fourth control information to the light source, and the light source is configured to: after receiving the fourth control information, output the first local oscillator optical signal and the first carrier optical signal that have a second preset wavelength.

3. The optical transceiver apparatus according to claim 2, wherein the light source further comprises a tunable laser and an optical splitter;
    when the light source receives the third control information, the tunable laser is configured to output continuous light having the first preset wavelength, and the optical splitter is configured to split the continuous light having the first preset wavelength, to obtain the first local oscillator optical signal and the first carrier optical signal; and
    when the light source receives the fourth control information, the tunable laser is configured to output continuous light having the second preset wavelength, and the optical splitter is configured to split the continuous light having the second preset wavelength, to obtain the first local oscillator optical signal and the first carrier optical signal.

4. The optical transceiver apparatus according to claim 2, wherein the light source further comprises a first laser, a second laser, and an optical splitter;
    when the light source receives the third control information, the first laser is configured to output continuous light having the first preset wavelength, and the optical splitter is configured to split the continuous light having the first preset wavelength, to obtain the first local oscillator optical signal and the first carrier optical signal; and
    when the light source receives the fourth control information, the second laser is configured to output continuous light having the second preset wavelength, and the optical splitter is configured to split the continuous light having the second preset wavelength, to obtain the first local oscillator optical signal and the first carrier optical signal.

5. The optical transceiver apparatus according to claim 1, wherein the optical path selector further comprises a first port, a second port, and a third port that are connected to the optical signal processor, a fourth port that is connected to the light source, and a fifth port, a sixth port, a seventh port, and an eighth port that are connected to the transmission fiber;
    when the optical path selector receives the first control information, the optical path selector is configured to establish an optical connection between the first port and the second port and establish an optical connection between the third port and the fourth port, to transmit, to the optical signal processor through the second port, the first modulated optical signal output by the first port, and transmit, to the optical signal processor through the third port, the first local oscillator optical signal output by the fourth port; and when the optical path selector receives the second control information, the optical path selector is configured to separately establish an optical connection between the first port and the fourth port and an optical connection between the fifth port and the eighth port, to transmit, to the transmission fiber through the fifth port and the eighth port, the first modulated optical signal output by the first port and the first local oscillator optical signal output by the fourth port; and separately establish an optical connection between the second port and the third port and an optical connection between the sixth port and the seventh port, to transmit, to the optical signal processor through the second port and the third port, the second local oscillator optical signal and the second modulated optical signal that are received by the sixth port and the seventh port.

6. The optical transceiver apparatus according to claim 5, wherein the transmission fiber further comprises a first transmission fiber and a second transmission fiber, and the optical transceiver apparatus further comprises a first wavelength selector and a second wavelength selector;

the fifth port and the sixth port are connected to the first transmission fiber by using the first wavelength selector, and the first wavelength selector is configured to separate an optical signal transmitted between the fifth port and the first transmission fiber and an optical signal transmitted between the sixth port and the first transmission fiber that have different wavelengths; and the seventh port and the eighth port are connected to the second transmission fiber by using the second wavelength selector, and the first wavelength selector is configured to separate an optical signal transmitted between the seventh port and the second transmission fiber and an optical signal transmitted between the eighth port and the second transmission fiber that have different wavelengths.

7. The optical transceiver apparatus according to claim 6, wherein the first wavelength selector and/or the second wavelength selector further comprises at least one of the following apparatuses: a wavelength division multiplexer or a wavelength selective switch.

8. The optical transceiver apparatus according to claim 5, wherein the transmission fiber further comprises a third transmission fiber, a fourth transmission fiber, a fifth transmission fiber, and a sixth transmission fiber; and the fifth port is connected to the third transmission fiber, the sixth port is connected to the fourth transmission fiber, the seventh port is connected to the fifth transmission fiber, and the eighth port is connected to the sixth transmission fiber.

9. The optical transceiver apparatus according to claim 5, wherein the optical path selector includes a first selector and a second selector; wherein the first selector consists of the first port, the second port, the fifth port, and the sixth port; and the second selector consists of the third port, the fourth port, the seventh port, and the eighth port.

10. The optical transceiver apparatus according to claim 1, wherein the optical path selector further comprises at least one of the following apparatuses: a micro-electro-mechanical system (MEMS), an optical waveguide, and a silicon optical waveguide.

11. A method applied to an optical transceiver apparatus comprising a light source, an optical signal processor, and an optical path selector, wherein the light source is separately connected to the optical signal processor and the optical path selector, the optical signal processor is connected to the optical path selector, the light source is configured to provide a first local oscillator optical signal and a first carrier optical signal, and the optical signal processor is configured to modulate the first carrier optical signal and output a first modulated optical signal that has a same wavelength as the first carrier optical signal; and the method comprises:

generating control information based on a working mode of the optical transceiver apparatus; and controlling, based on the control information, the optical path selector to transmit the first local oscillator optical signal and the first modulated optical signal to the optical signal processor or a transmission fiber configured to transmit an optical signal to an outside of the optical transceiver apparatus;

wherein the method further comprising:

receiving, from the transmission fiber by using the optical path selector, a second local oscillator optical signal and a second modulated signal from an opposite optical transceiver apparatus; and transmitting the second local oscillator optical signal and the second modulated signal to the optical signal processor; and the working mode comprises a first mode and a second mode; and the generating control information based on the working mode of the optical transceiver apparatus further comprises:

when determining that the working mode of the optical transceiver apparatus is the first mode, generating first control information, wherein the first control information is used to control the optical path selector to transmit the first local oscillator optical signal and the first modulated optical signal to the optical signal processor; and when determining that the working mode of the optical transceiver apparatus is the second mode, generating second control information, wherein the second control information is used to control the optical path selector to transmit the first local oscillator optical signal and the first modulated optical signal to the transmission fiber.

12. The method according to claim 11, wherein, when determining that the working mode of the optical transceiver apparatus is the second mode, the method further comprises:

when determining that an apparatus type of the optical transceiver apparatus is a first type, sending third control information to the light source, and controlling, based on the third control information, the light source to output the first local oscillator optical signal and the first carrier optical signal that have a first preset wavelength; and when determining that an apparatus type of the optical transceiver apparatus is a second type, sending fourth control information to the light source, and controlling, based on the fourth control information, the light source to output the first local oscillator optical signal and the first carrier optical signal that have a second preset wavelength.

13. The method according to claim 12, wherein the light source comprises a tunable laser and an optical splitter, and the controlling, based on the third control information, the light source to output the first local oscillator optical signal and the first carrier optical signal that have the first preset wavelength further comprises:
controlling, based on the third control information, the tunable laser to output continuous light having the first preset wavelength, and controlling the optical splitter to split the continuous light having the first preset wavelength, so that the light source outputs the first local oscillator optical signal and the first carrier optical signal that have the first preset wavelength.

14. The method according to claim 12, wherein the light source comprises a tunable laser and an optical splitter, and the controlling, based on the fourth control information, the light source to output the first local oscillator optical signal and the first carrier optical signal that have the second preset wavelength further comprises:
controlling, based on the fourth control information, the tunable laser to output continuous light having the second preset wavelength; and
controlling the optical splitter to split the continuous light having the second preset wavelength, so that the light source outputs the first local oscillator optical signal and the first carrier optical signal that have the second preset wavelength.

15. The method according to claim 12, wherein the light source comprises a first laser and an optical splitter, and the controlling, based on the third control information, the light source to output the first local oscillator optical signal and the first carrier optical signal that have the first preset wavelength further comprises:
controlling, based on the third control information, the first laser to output continuous light having the first preset wavelength; and
controlling the optical splitter to split the continuous light having the first preset wavelength, so that the light source outputs the first local oscillator optical signal and the first carrier optical signal that have the first preset wavelength.

16. The method according to claim 15, wherein the light source further comprises a second laser, and the controlling, based on the fourth control information, the light source to output the first local oscillator optical signal and the first carrier optical signal that have the second preset wavelength further comprises:
controlling, based on the fourth control information, the second laser to output continuous light having the second preset wavelength; and
controlling the optical splitter to split the continuous light having the second preset wavelength, so that the light source outputs the first local oscillator optical signal and the first carrier optical signal that have the second preset wavelength.

17. The method according to claim 11, wherein the optical path selector comprises a first port, a second port, and a third port that are connected to the optical signal processor, a fourth port that is connected to the light source, and a fifth port, a sixth port, a seventh port, and an eighth port that are connected to the transmission fiber; and
the controlling, based on the control information, the optical path selector to transmit the first local oscillator optical signal and the first modulated optical signal to the optical signal processor or the transmission fiber further comprises:
sending the first control information to the optical path selector; and
controlling, based on the first control information, the optical path selector to establish an optical connection between the first port and the second port and establish an optical connection between the third port and the fourth port, to transmit, to the optical signal processor through the second port, the first modulated optical signal output by the first port, and transmit, to the optical signal processor through the third port, the first local oscillator optical signal output by the fourth port; or
sending the second control information to the optical path selector; and
controlling, based on the second control information, the optical path selector to separately establish an optical connection between the first port and the fourth port and an optical connection between the fifth port and the eighth port, to transmit, to the transmission fiber through the fifth port and the eighth port, the first modulated optical signal output by the first port and the first local oscillator optical signal output by the fourth port.

18. The method according to claim 17, wherein the optical path selector includes a first selector and a second selector; wherein the first selector consists of the first port, the second port, the fifth port, the sixth port, and the second selector consists of the third port, the fourth port, the seventh port, and the eighth port.

19. The method according to claim 17, wherein the transmission fiber further comprises a first transmission fiber and a second transmission fiber, and the optical transceiver apparatus further comprises a first wavelength selector and a second wavelength selector;
the fifth port and the sixth port are connected to the first transmission fiber by using the first wavelength selector, and the first wavelength selector is configured to separate an optical signal transmitted between the fifth port and the first transmission fiber and an optical signal transmitted between the sixth port and the first transmission fiber that have different wavelengths; and
the seventh port and the eighth port are connected to the second transmission fiber by using the second wavelength selector, and the first wavelength selector is configured to separate an optical signal transmitted between the seventh port and the second transmission fiber and an optical signal transmitted between the eighth port and the second transmission fiber that have different wavelengths.

20. The method according to claim 19, wherein the first wavelength selector and/or the second wavelength selector further comprises at least one of the following apparatuses: a wavelength division multiplexer or a wavelength selective switch.

* * * * *